(12) United States Patent
Watanabe et al.

(10) Patent No.: US 11,945,560 B2
(45) Date of Patent: Apr. 2, 2024

(54) STORAGE MEDIUM, NAVIGATION MONITORING METHOD, AND NAVIGATION MONITORING DEVICE

(71) Applicant: FUJITSU LIMITED, Kawasaki (JP)

(72) Inventors: Isamu Watanabe, Kawasaki (JP); Shinji Ito, Kawasaki (JP); Hiraku Fujimoto, Zushi (JP); Ryusei Ikeda, Sayama (JP); Kenta Usui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 89 days.

(21) Appl. No.: 17/850,870

(22) Filed: Jun. 27, 2022

(65) Prior Publication Data
US 2023/0119566 A1    Apr. 20, 2023

(30) Foreign Application Priority Data

Oct. 18, 2021   (JP) ................................. 2021-170567

(51) Int. Cl.
*G08G 3/00*   (2006.01)
*B63B 79/20*   (2020.01)
(Continued)

(52) U.S. Cl.
CPC .............. *B63B 79/40* (2020.01); *B63B 79/20* (2020.01); *G08G 3/02* (2013.01); *G06F 16/29* (2019.01)

(58) Field of Classification Search
CPC ...... G01C 21/203; G01C 21/24; G01C 21/26; B63B 79/20; B63B 79/40; B63B 22/16; G08G 3/00; G08G 3/02
(Continued)

(56) References Cited

U.S. PATENT DOCUMENTS

| 10,000,262 B2 * | 6/2018 | Ando | G06F 3/14 |
| 2011/0210865 A1 * | 9/2011 | Lee | G08G 3/02 |
| | | | 340/903 |

(Continued)

FOREIGN PATENT DOCUMENTS

| CN | 107393346 A | * | 11/2017 | ............... G08G 3/02 |
| CN | 111307167 A | * | 6/2020 | ............. G01C 21/32 |

(Continued)

OTHER PUBLICATIONS

Liraz, Shay Paz. "Ships Trajectories Prediction Using Recurrent Neural Networks Based on AIS Data." Calhoun Institutional Archive of the Naval Postgraduate School. (Year: 2018).*

(Continued)

*Primary Examiner* — Cuong H Nguyen
(74) *Attorney, Agent, or Firm* — Fujitsu Intellectual Property Center

(57) ABSTRACT

A non-transitory computer-readable storage medium storing a navigation monitoring program that causes at least one computer to execute a process, the process includes acquiring direction information that indicates a direction of a vessel and position information that indicates a position of the vessel; and predicting whether or not the vessel navigates along a course by inputting the acquired direction information and the acquired position information to a prediction model generated by machine learning by using direction information and position information for each of a plurality of vessels that has navigated in the past and a correct answer label that indicates whether or not each of the plurality of vessels navigates along a course.

7 Claims, 22 Drawing Sheets

(51) Int. Cl.
*B63B 79/40* (2020.01)
*G08G 3/02* (2006.01)
*G06F 16/29* (2019.01)

(58) Field of Classification Search
USPC .................................................. 701/21, 117
See application file for complete search history.

(56) References Cited

U.S. PATENT DOCUMENTS

| | | | |
|---|---|---|---|
| 2018/0354598 A1 | 12/2018 | Adachi | |
| 2020/0035106 A1* | 1/2020 | Suzuki | G08G 3/02 |
| 2021/0080260 A1* | 3/2021 | Tremblay | G01C 21/30 |
| 2021/0233026 A1* | 7/2021 | Martinos | H04L 67/10 |
| 2022/0214171 A1* | 7/2022 | Johnson | B63B 79/40 |

FOREIGN PATENT DOCUMENTS

| | | | |
|---|---|---|---|
| CN | 113450596 B * | 7/2022 | ............ B63B 79/40 |
| GB | 2596709 A * | 1/2022 | ......... B60L 15/2045 |
| JP | S60-244882 A | 12/1985 | |
| JP | 2022183692 A * | 12/2022 | ............ B63B 79/40 |
| KR | 101275277 B1 * | 6/2013 | .............. C08G 3/02 |
| WO | WO-2015045117 A1 * | 4/2015 | ............. B63B 49/00 |
| WO | 2017/138126 A1 | 8/2017 | |
| WO | WO-2020206380 A1 * | 10/2020 | ......... B60L 15/2045 |

OTHER PUBLICATIONS

Tu, Enmei, et al. "Modeling historical AIS data for vessel path prediction: A comprehensive treatment." arXiv preprint arXiv: 2001.01592. (Year: 2020).*
Tu, Enmei, et al. "Exploiting AIS data for intelligent maritime navigation: A comprehensive survey from data to methodology." IEEE Transactions on Intelligent Transportation Systems 19.5 1559-1582.: (Year: 2017).*
Zhao, Jiandong, et al. "Traffic speed prediction under non-recurrent congestion: Based on LSTM method and BeiDou navigation satellite system data." IEEE Intelligent Transportation Systems Magazine 11.2 70-81: (Year: 2019).*
Tu, Enmei, et al. "Exploiting AIS data for intelligent maritime navigation: A comprehensive survey from data to methodology." IEEE Transactions on Intelligent Transportation Systems 19.5 (2017): 1559-1582. (Year: 2017).*
Xiao, Zhe et al., "Traffic Pattern Mining and Forecasting Technologies in Maritime Traffic Service Networks: A Comprehensive Survey", IEEE Transactions on Intelligent Transportation Systems, IEEE, Piscataway, NJ, USA, vol. 21, No. 5, XP011786082, pp. 1796-1825, May 1, 2020 [retrieved on May 1, 2020].
Extended European Search Report dated Jan. 11, 2023 for corresponding European Patent Application No. 22182555.7, 9 pages.
Takashi Kubota et al., "Navigator's Decision-making and Action Model II—Synthetically Subjective Risk of Collision—", The journal of Japan Institute of Navigation, No. 122, pp. 21-26, Abstract, Mar. 2010 (Total 6 pages).
Hoong Chor Chin et al., "Modeling Perceived Collision Risk in Port Water Navigation", Elsevier, Safety Science, 47 (2009), DOI: 10.1016/j.ssci.2009.04.004, pp. 1410-1416, 2009 (Total 7 pages).

* cited by examiner

FIG. 5
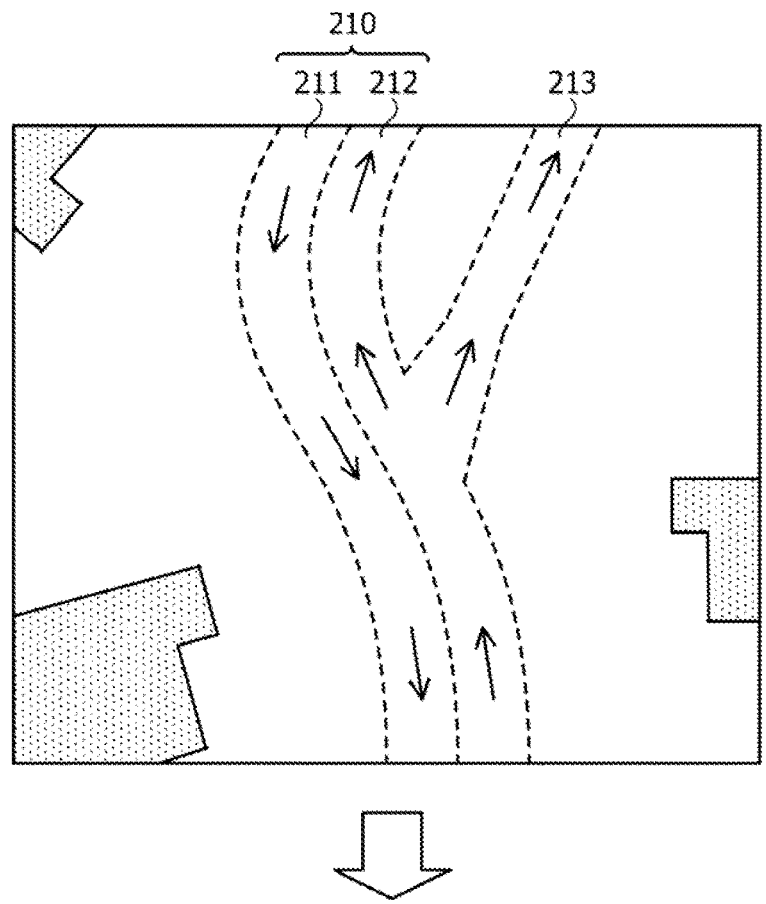
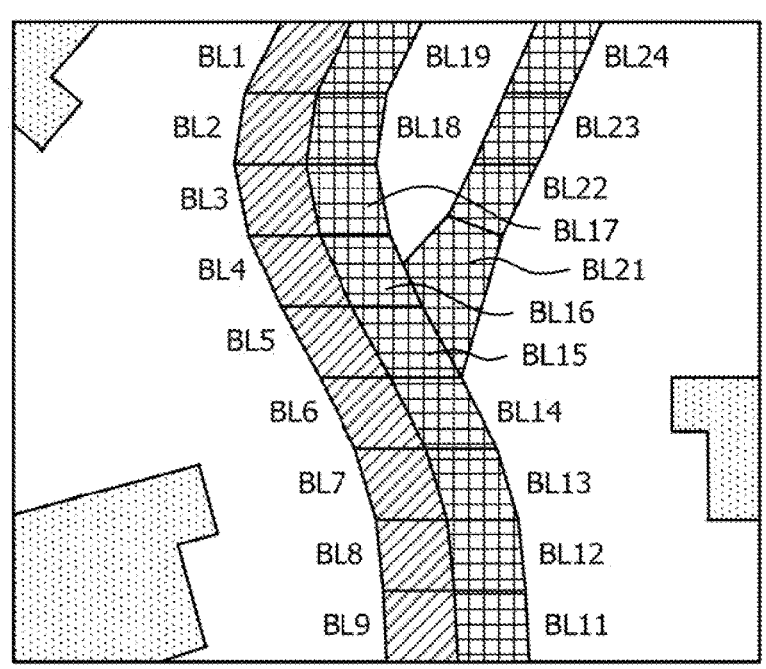

STORAGE MEDIUM, NAVIGATION MONITORING METHOD, AND NAVIGATION MONITORING DEVICE

CROSS-REFERENCE TO RELATED APPLICATION

This application is based upon and claims the benefit of priority of the prior Japanese Patent Application No. 2021-170567, filed on Oct. 18, 2021, the entire contents of which are incorporated herein by reference.

FIELD

The embodiments discussed herein are related to a storage medium, a navigation monitoring method, and a navigation monitoring device.

BACKGROUND

Vessels generally have a property such that, as a size of the vessel is larger, it is more difficult to suddenly change a course or stop. Therefore, various techniques to avoid a collision between vessels have been developed. For example, it is considered to detect approach between vessels or calculate a collision risk between vessels on the basis of a distance between vessels, course over ground of each vessel, or the like.

Furthermore, as related art, for example, a course display device is proposed that determines that own vessel deviates from a course in a case where a position of the own vessel does not exist in all unit course areas set in a course area. Moreover, a system has been proposed that detects a change direction of a position of a vessel, specifies a traveling direction associated with a navigation area specified from the position of the vessel on the basis of information in which the navigation area is associated with the traveling direction, and detects backward navigation within the navigation area of the vessel on the basis of an angle formed by the change direction and the traveling direction.

Japanese Laid-open Patent Publication No. 60-244882 and International Publication Pamphlet No. WO 2017/138126 are disclosed as related art.

SUMMARY

According to an aspect of the embodiments, a non-transitory computer-readable storage medium storing a navigation monitoring program that causes at least one computer to execute a process, the process includes acquiring direction information that indicates a direction of a vessel and position information that indicates a position of the vessel; and predicting whether or not the vessel navigates along a course by inputting the acquired direction information and the acquired position information to a prediction model generated by machine learning by using direction information and position information for each of a plurality of vessels that has navigated in the past and a correct answer label that indicates whether or not each of the plurality of vessels navigates along a course.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating a block setting method;

DESCRIPTION OF EMBODIMENTS

A technique for predicting whether or not a vessel navigates along a course has a problem in that it is difficult to perform accurate prediction, for example, in a case where the course is curved.

In one aspect, an object of the embodiment is to provide a navigation monitoring program, a navigation monitoring method, and a navigation monitoring device that can accurately predict whether or not a vessel navigates along a course.

In one aspect, it is possible to accurately predict whether or not a vessel navigates along a course.

Hereinafter, embodiments will be described with reference to the drawings.

First Embodiment

Figure 1:
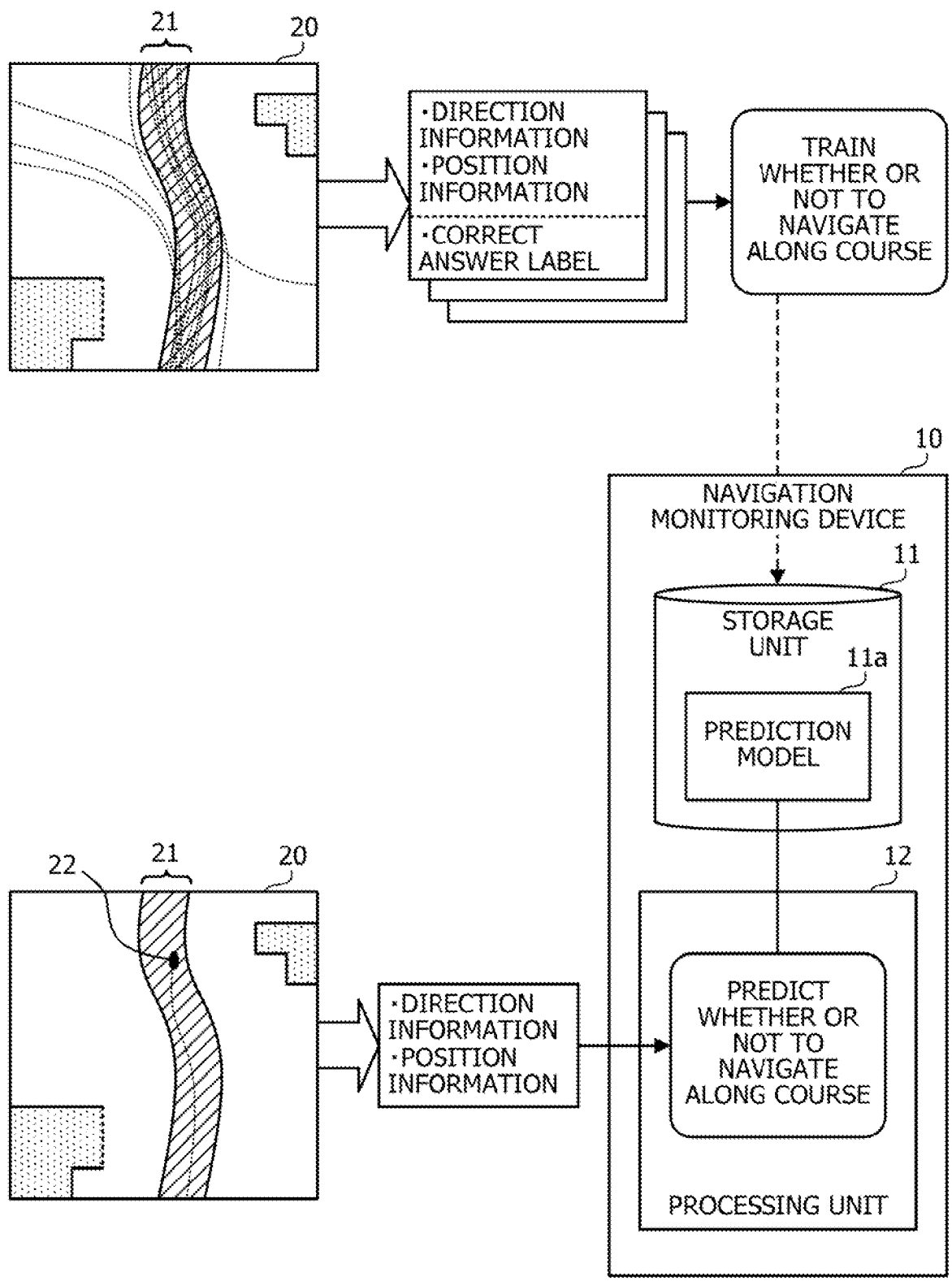
FIG. 1 is a diagram illustrating a configuration example and a processing example of a navigation monitoring device according to a first embodiment.

FIG. 1 is a diagram illustrating a configuration example and a processing example of a navigation monitoring device according to a first embodiment. A navigation monitoring device 10 illustrated in FIG. 1 is a device that predicts whether or not a vessel under way navigates along a course and outputs a prediction result. By using such a prediction result, for example, it is possible to assist navigation of a vessel. This navigation monitoring device 10 includes a storage unit 11 and a processing unit 12.

The storage unit 11 is a storage region of a storage device (not illustrated) included in the navigation monitoring device 10. The storage unit 11 stores data indicating a prediction model 11a. The prediction model 11a is a trained model that has trained a predictor that predicts whether or not a vessel navigates along a course. The processing unit 12 is, for example, a processor (not illustrated) included in the navigation monitoring device 10. The processing unit 12 predicts whether or not the vessel under way navigates along the course using the prediction model 11a.

The prediction model 11a is created according to the following procedure. As illustrated in the upper side of FIG. 1, for each of a plurality of vessels that has navigated a certain sea area (for example, specific port) in the past, direction information indicating a direction of a vessel, position information indicating a position of the vessel, and a correct answer label indicating whether or not the vessel navigates along a course are acquired. Then, through training using the direction information, the position information, and the correct answer label for each of the plurality of vessels, the prediction model 11a that predicts whether or not the vessel navigates along the course is created.

Note that, as the direction information, for example, course over ground, heading, or the like can be used. Furthermore, as the position information, for example, at least one of a latitude and a longitude can be used. Alternatively, as the position information, the following section numbers can be used.

In a chart 20 illustrated in FIG. 1, a course area 21 set in a certain sea area is illustrated. The course area 21 is an area having a predetermined width along the course. By dividing such a course area 21 into polygons along a course direction, a plurality of sections is set. As the position information, a section number indicating a section where the vessel is positioned, among the plurality of sections, can be used.

Furthermore, the correct answer label is set as follows, for example. It is assumed that the vessel exist in the course area 21 described above at a certain time. Then, in a case where the vessel exists in the course area 21 when the vessel navigates for a predetermined time period or for a predetermined distance thereafter, a value indicating that the vessel has navigated along the course is set as the correct answer label. Furthermore, the correct answer label can be set using the section described above. For example, it is assumed that the vessel exist in a certain section at a certain time. Then, in a case where the vessel reaches a section that is a predetermined number of sections ahead in the course direction from the section thereafter, a value indicating that the vessel has navigated along the course is set as the correct answer label.

The processing unit 12 executes prediction processing in the following procedure. The processing unit 12 acquires direction information indicating a direction of a vessel 22 under way and position information indicating a position. By inputting the acquired direction information and position information into the prediction model 11a, the processing unit 12 predicts whether or not the vessel 22 navigates along the course. As a prediction result, for example, a value of a probability that the vessel 22 navigates along the course is output.

Here, for example, a method for predicting whether or not the vessel navigates along the course on the basis of only the direction information of the vessel has the following problems. For example, in a region where a course is curved, the direction of the vessel faces outside the course area 21. Therefore, even in a case where the vessel actually continues to navigate along the course, there is a possibility that it is predicted that the vessel deviates from the course.

On the other hand, in the present embodiment, the prediction model 11a considering a relationship between the direction and the position of the vessel is created. Then, by inputting the direction information and the position information of the vessel under way into the prediction model 11a, it is predicted whether or not the vessel navigates along the course. This makes it possible to make predictions with a certain accuracy or higher regardless of whether or not the course is curved. Therefore, it can be accurately predicted whether or not the vessel navigates along the course.

Second Embodiment

Next, a system that applies the prediction processing by the navigation monitoring device 10 illustrated in FIG. 1 to determination of a collision risk between vessels will be described.

Figure 2:
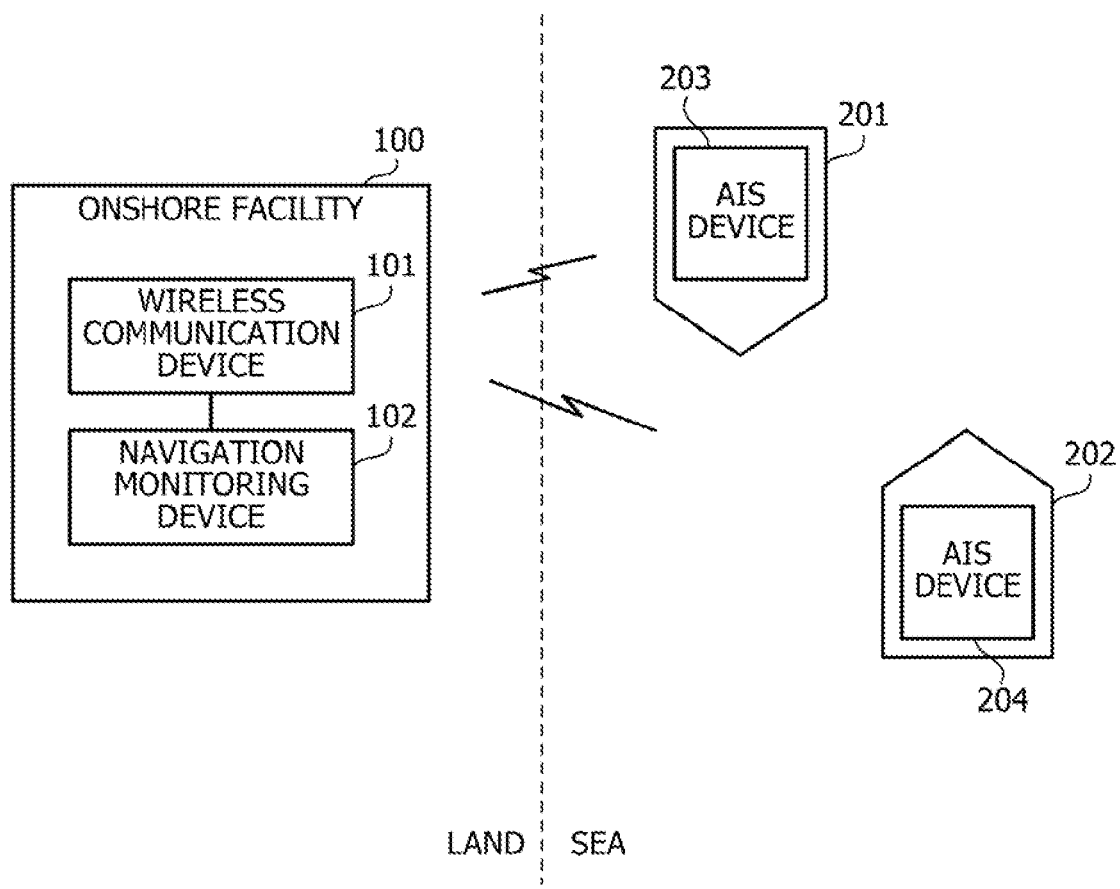
FIG. 2 is a diagram illustrating a configuration example of a navigation assisting system according to a second embodiment.

FIG. 2 is a diagram illustrating a configuration example of a navigation assisting system according to a second embodiment. The navigation assisting system illustrated in FIG. 2 is an information processing system that assists navigation of a vessel. This navigation assisting system includes an onshore facility 100 provided on land. The onshore facility 100 is, for example, a facility that controls navigation of a vessel on the sea. In this case, the onshore facility 100 grasps a position of each vessel on the basis of automatic identification system (AIS) data received from each vessel and detection information by a radar and provides various types of information regarding maritime traffic of each vessel.

The AIS data includes dynamic information, static information, and navigation related information (quasi-dynamic information). The dynamic information includes, for example, a current time, a position of a vessel (latitude, longitude), course over ground (COG), speed over ground (SOG), heading (HDG), a rate of turn (ROT), or the like. The static information includes, for example, a maritime mobile service identity (MMSI) number used to identity a vessel, a vessel type, a length of a vessel, or the like. The navigation related information includes a destination, a draft, or the like.

In the present embodiment, the onshore facility 100 includes a wireless communication device 101 that can receive AIS data from each vessel and a navigation monitoring device 102 that monitors navigation of the vessel using the AIS data. The wireless communication device 101 includes, for example, an antenna for receiving the AIS data. The navigation monitoring device 102 is a device that has the processing function of the navigation monitoring device 10 illustrated in FIG. 1 and is implemented, for example, as a server computer. The navigation monitoring device 102 detects a pair of vessels that have a collision risk on the basis of the AIS data received by the wireless communication device 101 and outputs warning information that notifies these vessels.

Note that, in FIG. 2, vessels 201 and 202 navigating on the sea are illustrated. The vessels 201 and 202 respectively include AIS devices 203 and 204 that can transmit and receive the AIS data. The vessels 201 and 202 can transmit the AIS data regarding the own vessel to other vessels and the onshore facility 100 respectively via the AIS devices 203 and 204 and can receive AIS data transmitted from other vessels respectively via the AIS devices 203 and 204.

Furthermore, at least some of the processing functions of the navigation monitoring device 102 may be mounted on the vessel. For example, a monitoring device mounted on the vessel detects a pair of vessels that has a collision risk on the basis of the AIS data of the vessels under way including the own vessel and makes a display device display information indicating the detected vessels.

Figure 3:
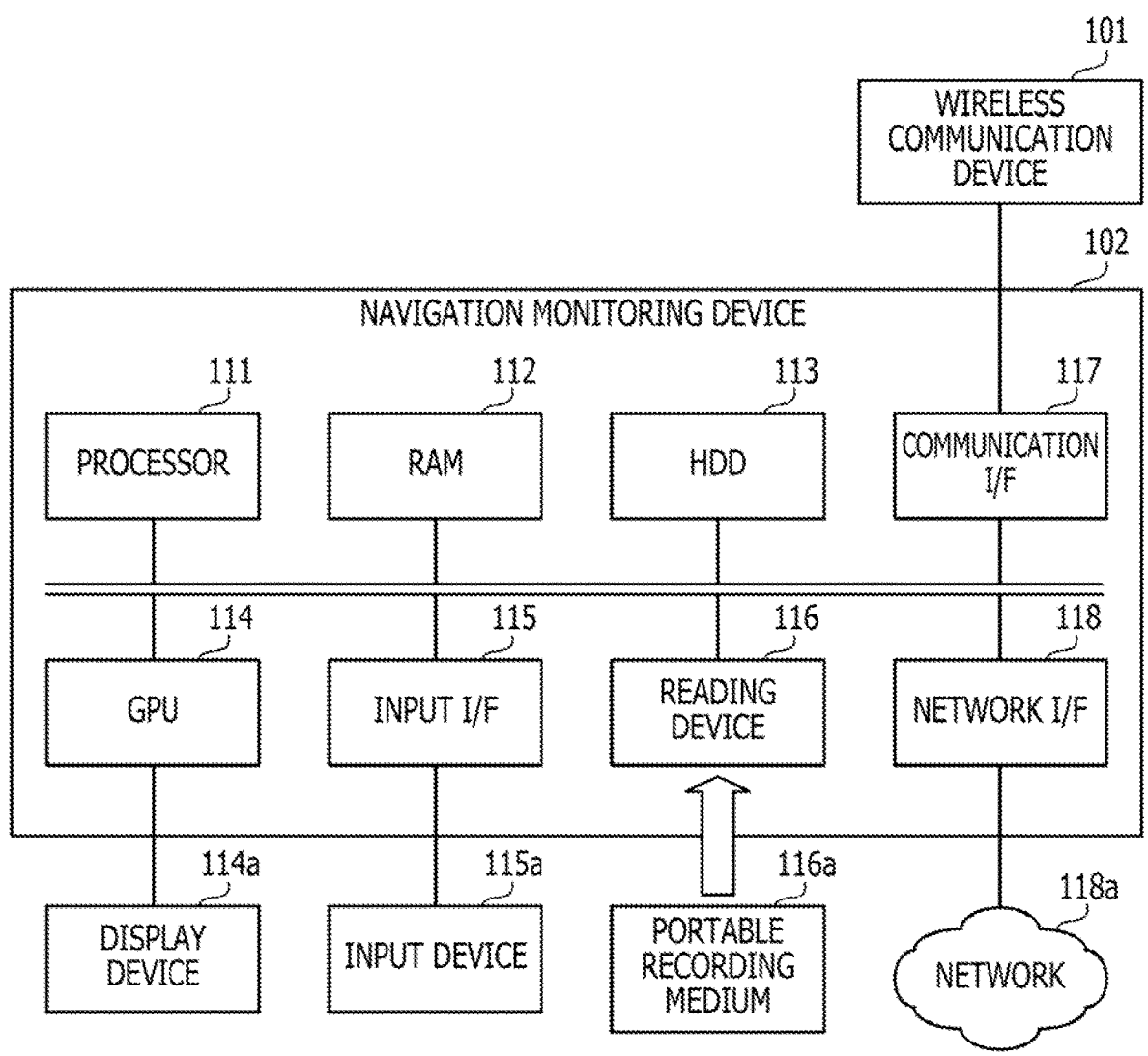
FIG. 3 is a diagram illustrating a hardware configuration example of the navigation monitoring device.

FIG. 3 is a diagram illustrating a hardware configuration example of the navigation monitoring device. The navigation monitoring device 102 is implemented, for example, as a computer as illustrated in FIG. 3. The navigation monitoring device 102 illustrated in FIG. 3 includes a processor 111, a random access memory (RAM) 112, a hard disk drive (HDD) 113, a graphics processing unit (GPU) 114, an input interface (I/F) 115, a reading device 116, a communication interface (I/F) 117, and a network interface (I/F) 118.

The processor 111 integrally controls the entire navigation monitoring device 102. The processor 111 is, for example, a central processing unit (CPU), a micro processing unit (MPU), a digital signal processor (DSP), an application specific integrated circuit (ASIC), or a programmable logic device (PLD). Furthermore, the processor 111 may be a combination of two or more elements of the CPU, MPU, DSP, ASIC, and PLD.

The RAM 112 is used as a main storage device of the navigation monitoring device 102. The RAM 112 temporarily stores at least some of operating system (OS) programs and application programs to be executed by the processor 111. Furthermore, the RAM 112 stores various types of data needed for processing by the processor 111.

The HDD 113 is used as an auxiliary storage device of the navigation monitoring device 102. The HDD 113 stores OS programs, application programs, and various types of data. Note that, as the auxiliary storage device, another type of nonvolatile storage device such as a solid state drive (SSD) can be used.

A display device 114a is connected to the GPU 114. The GPU 114 displays an image on the display device 114a in accordance with an instruction from the processor 111. Examples of the display device include a liquid crystal display, an organic electroLuminescence (EL) display, or the like.

The input interface 115 is connected to an input device 115a. The input interface 115 transmits a signal output from the input device 115a to the processor 111. Examples of the input device 115a include a keyboard, a pointing device, or the like. Examples of the pointing device include a mouse, a touch panel, a tablet, a touch pad, a track ball, and the like.

A portable recording medium 116a is attached/detached to/from the reading device 116. The reading device 116 reads data recorded on the portable recording medium 116a and transmits the data to the processor 111. Examples of the portable recording medium 116a include an optical disc, a magneto-optical disc, a semiconductor memory, and the like.

The communication interface 117 exchanges data with another device, for example, the wireless communication device 101 or the like.

The network interface 118 exchanges data with another device via a network 118a.

The processing function of the navigation monitoring device 102 can be implemented by the hardware configuration as described above.

Figure 4:
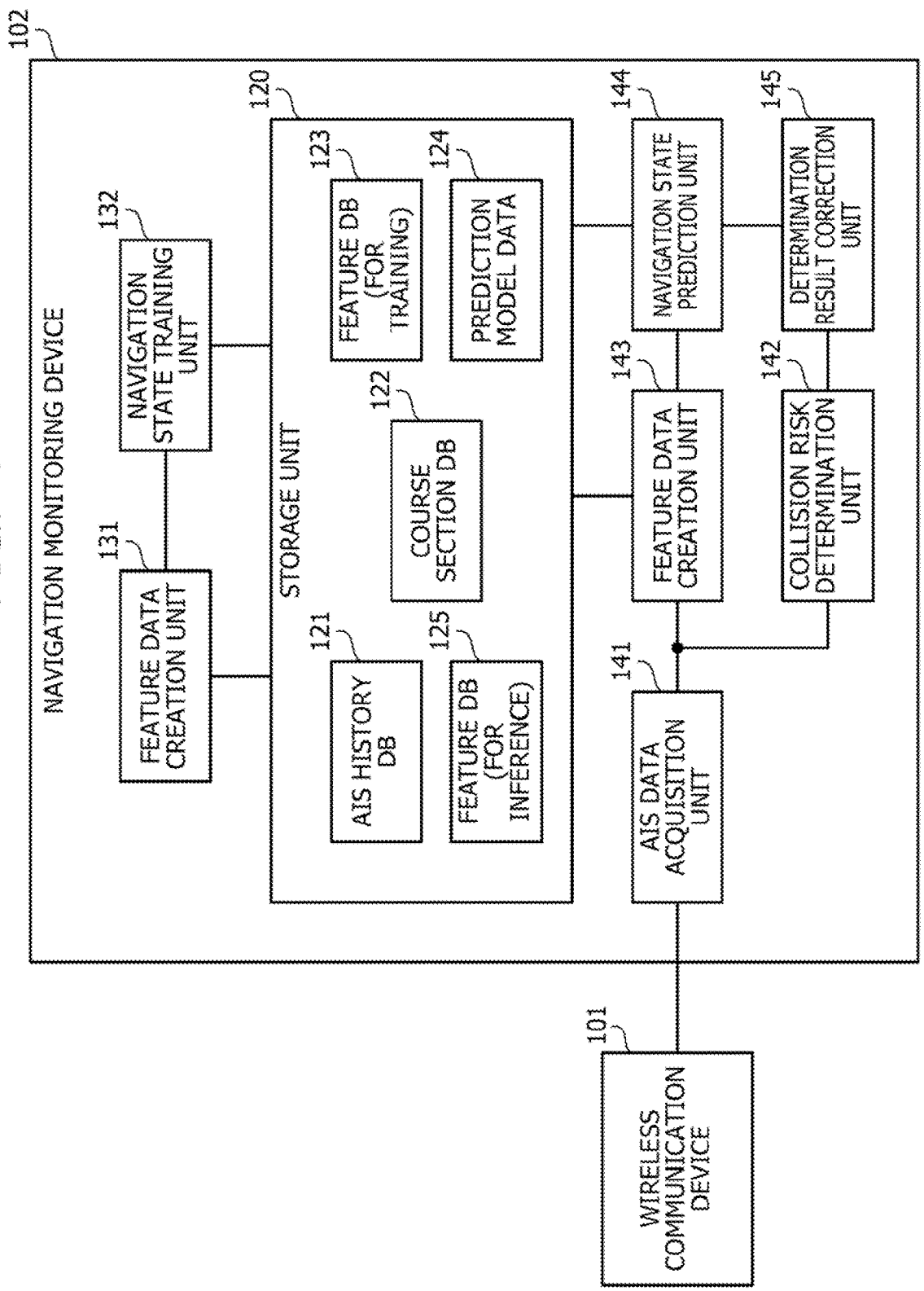
FIG. 4 is a diagram illustrating a configuration example of a processing function included in the navigation monitoring device.

FIG. 4 is a diagram illustrating a configuration example of processing functions included in the navigation monitoring device. As illustrated in FIG. 4, the navigation monitoring device 102 includes a storage unit 120, a feature data creation unit 131, a navigation state training unit 132, an AIS data acquisition unit 141, a collision risk determination unit 142, a feature data creation unit 143, a navigation state prediction unit 144, and a determination result correction unit 145.

The storage unit 120 is a storage region of a storage device included in the navigation monitoring device 102, for example, the RAM 112, the HDD 113, or the like. The storage unit 120 stores an AIS history database (DB) 121, a course section database (DB) 122, a training feature database (DB) 123, prediction model data 124, and an inference feature database (DB) 125.

The AIS history database 121 stores the AIS data transmitted from each of the plurality of vessels during navigation in the past.

The course section database 122 stores information regarding a block (course section) set in the course area. The block is a section generated by dividing the course area into polygons. Each block is identified by a block ID.

The feature database 123 stores feature data created by the feature data creation unit 131 on the basis of the information stored in the AIS history database 121. The feature data stored in the feature database 123 is used to train a navigation state by the navigation state training unit 132.

The prediction model data 124 is data indicating a trained model used to calculate a navigation state index and is created as a result of training by the navigation state training unit 132. The navigation state index is a quantitative index indicating a possibility that a vessel positioned in a certain block in the course area continues to navigate along the course thereafter. Therefore, the trained model indicated by the prediction model data 124 indicates a model of a predictor (prediction model) that predicts whether or not the vessel navigates (continues to navigate) along the course thereafter.

The feature data regarding the vessel under way is accumulated in the feature database 125. This feature data is created by the feature data creation unit 143 on the basis of the AIS data transmitted from the vessel under way and received by the wireless communication device 101.

The processing of the feature data creation unit 131, the navigation state training unit 132, the AIS data acquisition unit 141, the collision risk determination unit 142, the feature data creation unit 143, the navigation state prediction unit 144, and the determination result correction unit 145 is implemented, for example, by executing a predetermined application program by the processor 111.

The feature data creation unit 131 creates feature data used to train a navigation state on the basis of the AIS data stored in the AIS history database 121 and registers the created feature data in the feature database 123.

The navigation state training unit 132 creates a prediction model for predicting the navigation state through training using the feature data registered in the feature database 123 as training data (teacher data). Data of the created prediction model is stored in the storage unit 120 as the prediction model data 124.

The AIS data acquisition unit 141 acquires AIS data transmitted from a vessel that is currently navigating via the wireless communication device 101.

The collision risk determination unit 142 determines a collision risk between vessels under way on the basis of the AIS data acquired by the AIS data acquisition unit 141.

The feature data creation unit 143 creates feature data corresponding to the vessel under way on the basis of the AIS data acquired by the AIS data acquisition unit 141 with a method similar to the feature data creation unit 131. The feature data creation unit 143 transfers the created feature data to the navigation state prediction unit 144 and accumulates the feature data in the feature database 125.

The navigation state prediction unit 144 calculates a navigation state index for a vessel by inputting the feature data of the vessel into the prediction model (trained model) based on the prediction model data 124. As a result, a navigation state indicating whether or not the vessel navigates (continues to navigate) along the course is predicted.

The determination result correction unit 145 corrects a collision risk determination result by the collision risk determination unit 142 using the navigation state prediction result by the navigation state prediction unit 144. This correction reduces a possibility of erroneous determination by the collision risk determination unit 142.

In the navigation monitoring device 102 above, the collision risk determination unit 142 determines the collision risk between the vessels under way. This collision risk is determined, for example, on the basis of an extension vector for each vessel, a distance to closest point of approach (DCPA) or a time to closest point of approach (TCPA) between vessels, an obstacle zone by target (OZT) between one vessel and another vessel, or the like.

However, these pieces of information are information obtained on the assumption that the vessel linearly navigates. Therefore, there has been a problem in that the collision risk is overestimated, for example, in a part where a course is curved, in a case where the collision risk is determined on the basis of these pieces of information.

Therefore, the navigation monitoring device 102 predicts whether or not the vessel navigates along the course by the navigation state prediction unit 144. This prediction is made on the basis of information such as the navigation direction and the position included in the AIS data from the vessel. Then, the determination result by the collision risk determination unit 142 is corrected by the determination result correction unit 145 according to the prediction result by the navigation state prediction unit 144.

Furthermore, the navigation state is predicted using a trained model (prediction model) trained using AIS data collected in the past. The feature data creation unit 131 and the navigation state training unit 132 of the navigation monitoring device 102 are processing functions for executing training processing for creating such a trained model.

<Basic Concept of Navigation State Prediction>

First, the basic concept of navigation state prediction of a vessel will be described. In order to determine whether or not the vessel travels along a course, a course area is divided into a plurality of blocks. A block setting method will be described with reference to FIG. 5 below.

FIG. 5 is a diagram illustrating the block setting method. The block is a polygonal section generated by dividing the course area along the navigation direction. In the present embodiment, the block is a quadrangle as an example. However, the shape of the polygon of the block is not particularly limited. For example, in a portion where the course is a straight line, the block may be a quadrangle, and in a portion where the course is curved, the block may be a pentagon or a hexagon. Furthermore, the "course area" here is an area defined as a passage through which a vessel navigates. For example, the course has a width, and the entire area in the width direction is the course area. The course area is defined according to predetermined rules regarding navigation of vessels such as a cabinet order.

Moreover, the course may be a course through which only one-way navigation or bidirectional navigation can be performed. In the former case, a course in a certain direction and a course in a reverse direction are generally set in parallel. In this case, a block is set for each course in each direction.

In FIG. 5, as an example, it is assumed that the upper side indicates the north and the lower side indicates the south. A course area 210 illustrated on the upper side of FIG. 5 is divided into a course area 211 toward the south (direction from upper side to lower side in FIG. 5) and a course area 212 toward the north (direction from lower side to upper side in FIG. 5). In this case, blocks are individually set to the respective course areas 211 and 212. In the example illustrated in the lower side of FIG. 5, blocks BL1 to BL9 are set in order along the course direction in the course area 211, and blocks BL11 to BL19 are set in order along the course direction in the course area 212.

Furthermore, as illustrated in the upper side of FIG. 5, a course area 213 is branched from the middle of the course area 212 toward the north. In this case, blocks are also set to the course area 213. In the example illustrated in the lower side of FIG. 5, in the course area 213, blocks BL21 to BL24 are set in order along the course direction starting from the branched portion.

In the course section database 122, information indicating a position and a range of each of the set blocks is registered. By referring to the course section database 122, a block where the vessel is positioned can be specified from the position information (latitude, longitude) of the vessel.

Figure 6:
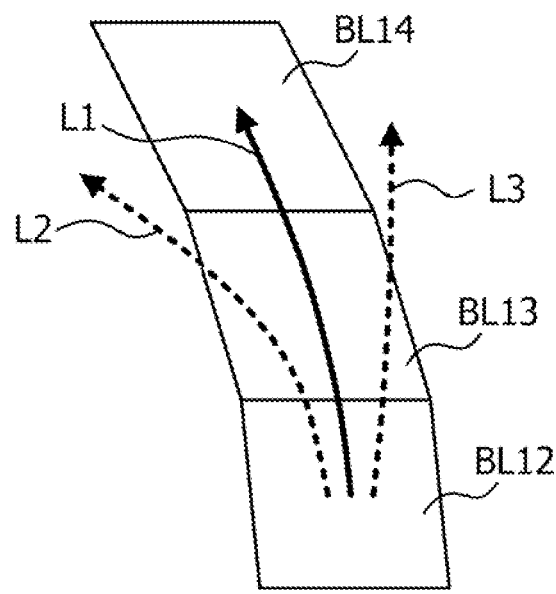
FIG. 6 is a diagram illustrating a basic determination method regarding whether or not to navigate along a course.

FIG. 6 is a diagram illustrating a basic determination method regarding whether or not to navigate along a course. In the present embodiment, it is determined whether or not the vessel navigates (continues to navigate) along the course according to how the vessel passes through the blocks described above. Basically, in a case where a vessel existing in a certain block passes through a next block along the navigation direction and reaches the subsequent block, it is assumed that it be determined that the vessel navigates along the course. For example, the navigation state prediction unit 144 predicts whether or not a vessel existing in a certain block passes through a next block and reaches a block that is two blocks ahead.

In the example in FIG. 6, it is assumed that a vessel currently exist in the block BL12. In this case, in a case where the vessel passes through the next block BL13 and reaches the subsequent block BL14 as indicated by an arrow L1, it is determined that the vessel navigates along the course. On the other hand, even if the vessel passes through the next block BL13, in a case where the vessel does not reach the subsequent block BL14, for example, as indicated by arrows L2 and L3, it is determined that the vessel does not continue to navigate along the course (deviate from course).

Here, as another example, a method is considered for making the above determination according to whether or not to reach the next block (whether or not to reach block BL13 in example in FIG. 6). In contrast to this method, the method illustrated in FIG. 6 has an advantage that the deviation from the course can be more quickly detected although difficulty in the prediction increases.

Note that, depending on the block setting status, a method for making the above determination according to whether or not to reach a next block or a block that is three or more blocks ahead, not the block that is two blocks ahead, may be adopted. For example, as the length of each block with respect to the course direction is shorter, it is considered to be more appropriate that it is determined whether or not to reach the subsequent blocks.

<Navigation State Training Processing>

Next, training processing for predicting a navigation state will be described.

Figure 7:
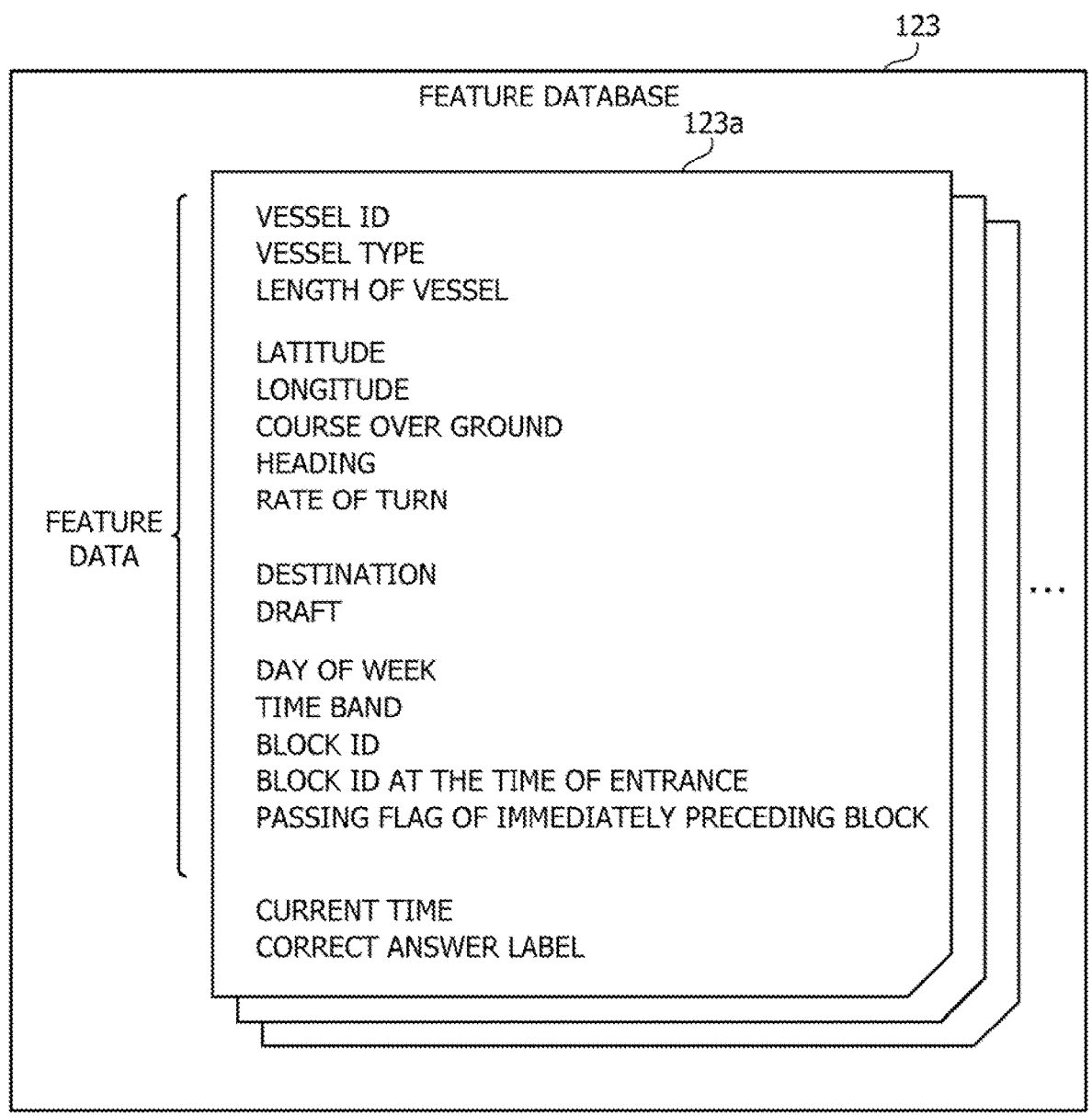
FIG. 7 is a diagram illustrating an example of data registered in a record of a feature database.

FIG. 7 is a diagram illustrating an example of data registered in a record of a feature database. In each record 123a of the training feature database 123, feature data used as training data (explanatory variable) at the time of training is registered. In the record 123a, as the feature data, a vessel ID, a vessel type, a length of a vessel, a latitude, a longitude, course over ground, heading, a rate of turn, a destination, a draft, a day of week, a time band, a block ID, a block ID at the time of entrance, and a passing flag of an immediately preceding block are registered. Furthermore, in each record 123a, a current time and a correct answer label are registered as data other than the feature data.

The AIS data is divided into each of the records of the dynamic information, the static information, and the navigation related information (quasi-dynamic information) and is transmitted from the vessel. On the feature data described above, the vessel ID, the vessel type, and the length of the vessel are extracted from the static information of the AIS data and registered in the record 123a. Note that, as the vessel ID, an MMSI number is extracted. Furthermore, the latitude, the longitude, the course over ground, the heading, and the rate of turn in the feature data described above are extracted from the dynamic information of the AIS data and registered in the record 123a. Moreover, the destination and the draft of the feature data described above are extracted from the navigation related information of the AIS data and registered in the record 123a.

A transmission interval from the vessel of the dynamic information is normally longer than those of the static information and the navigation related information. Therefore, the single record 123a is created based on the transmitted dynamic information. First, data extracted from the dynamic information to be the base is registered in the record 123a, and data extracted from the navigation related information transmitted from the same vessel immediately before the time when the dynamic information is transmitted is integrated into and is registered in the record 123a. Moreover, the data extracted from the static information from the same vessel is integrated with the record 123a and is registered. As the current time in the record 123a, a current time included in the dynamic information to be the base is registered.

On the other hand, the day of week, the time band, and the block ID of the feature data are data created by calculation based on the data included in the AIS data. The day of week and the time band are created on the basis of the current time. The block ID indicates an identification number of a block where a vessel is positioned, and is calculated on the basis of the latitude and the longitude and the course section database 122.

Furthermore, the block ID at the time of entrance and the passing flag of the immediately preceding block of the feature data are set on the basis of a navigation history of the same vessel, for example, information in a record of the feature database 123 at a time before the current time.

The block ID at the time of entrance indicates a block ID of a block where the vessel has entered first the course area where the vessel is positioned. For example, as illustrated in FIG. 5, it is assumed that the blocks BL1 to BL9 be set in the course area 211 toward the south. In a case where the vessel navigates within the course area 211 from the beginning, a block ID of the block BL1 is set as the block ID at the time of entrance. On the other hand, in a case where the vessel enters the course area 211 from the middle, a block ID of a block where the vessel has entered first is set as the block ID at the time of entrance. For example, in a case where the vessel has entered the block BL5 of the course area 211 from the left side (for example, west side) in FIG. 5, a block ID of the block BL5 is set as the block ID at the time of entrance.

The passing flag of the immediately preceding block indicates whether or not the vessel has passed through a block preceding (immediately preceding block) to the block where the vessel is positioned with respect to the navigation direction. In the present embodiment, in a case where the vessel has passed through the immediately preceding block, "1" is set as the passing flag, and in a case where the vessel has not passed through the immediately preceding block, "0" is set as the passing flag.

The correct answer label in the record 123a is data used as an objective variable at the time of training and indicates whether or not the vessel has continued to navigate along the course. In the present embodiment, in a case where the vessel has continued to navigate along the course (in a case of positive example), "1" is set as the correct answer label, and in a case where the vessel deviates from the course (in a case of negative example), "0" is set as the correct answer label.

Figure 8:
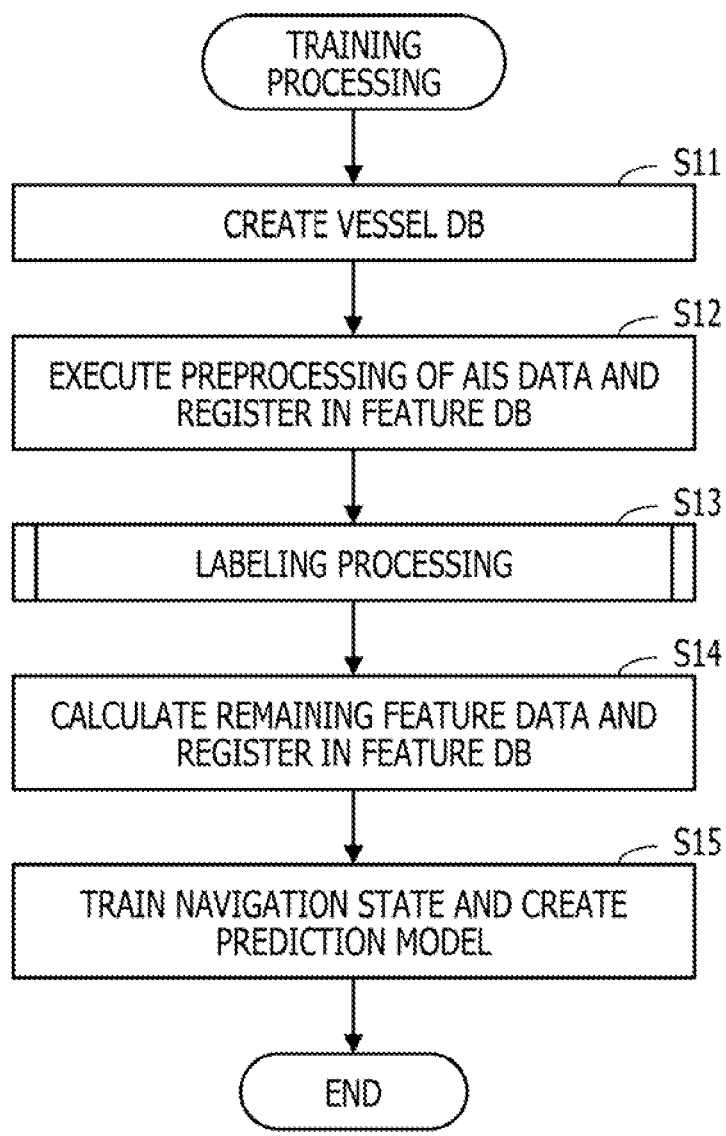
FIG. 8 is an example of a flowchart illustrating a training processing procedure of a navigation state.

FIG. 8 is an example of a flowchart illustrating a training processing procedure of a navigation state.

First, in steps S11 to S14, training data is created by the feature data creation unit 131.

[Step S11] The feature data creation unit 131 creates a vessel database (DB) as working data for data creation.

In this processing, first, the feature data creation unit 131 extracts static information from the AIS data stored in the AIS history database 121. Here, it is assumed that the vessel ID, the vessel type, and the length of the vessel be extracted as the static information. The feature data creation unit 131 registers the vessel ID, the vessel type, and the length of the vessel in the vessel database as a single record.

The static information may include data missing or variations of values. Therefore, the feature data creation unit 131 calculates a representative value of each of the vessel type and the length of the vessel for each record group in which the same vessel ID is registered. For example, the feature data creation unit 131 calculates a frequency of each value of the vessel type included in the record group with the same vessel ID and sets a value with the highest frequency as the representative value of the vessel type. Regarding the length of the vessel, the representative value is calculated with the similar procedure. The feature data creation unit 131 integrates the record group with the same vessel ID into a single record and registers the respective representative values as the vessel type and the length of the vessel of the record.

[Step S12] The feature data creation unit 131 executes preprocessing on the AIS data stored in the AIS history database 121. In this preprocessing, static information and navigation related information are integrated with the dynamic information to be the base.

For example, the feature data creation unit 131 extracts the dynamic information from the AIS data stored in the AIS history database 121. The feature data creation unit 131 creates a new record in the feature database 123 and registers a vessel ID, a current time, a latitude, a longitude, course over ground, heading, and a rate of turn included in the extracted dynamic information in the created record.

Next, the feature data creation unit 131 extracts navigation related information including the latest current time before the current time of the dynamic information from the navigation related information including the same vessel ID as the dynamic information described above, stored in the AIS history database 121. The feature data creation unit 131 registers a destination and a draft included in the extracted navigation related information in the record described above.

Moreover, the feature data creation unit 131 extracts a record including the same vessel ID as the dynamic information and the navigation related information described above from the vessel database and registers a vessel type and a length of the vessel included in the extracted record in the record described above.

Note that, in a case where items of the dynamic information and the navigation related information include an abnormal value or a missing value, the feature data creation unit 131 complements the abnormal value or the missing value with a method predetermined for each item (method using abnormal value determination rule or missing value complementing rule).

The feature data creation unit 131 executes the processing described above for each piece of the dynamic information stored in the AIS history database 121. As a result, feature data that is directly obtained from the AIS data stored in the AIS history database 121 is registered in the feature database 123.

[Step S13] The feature data creation unit 131 executes labeling processing for registering a correct answer label with respect to each record registered in the feature database 123. Hereinafter, details of the labeling processing will be described with reference to FIG. 9.

Figure 9:
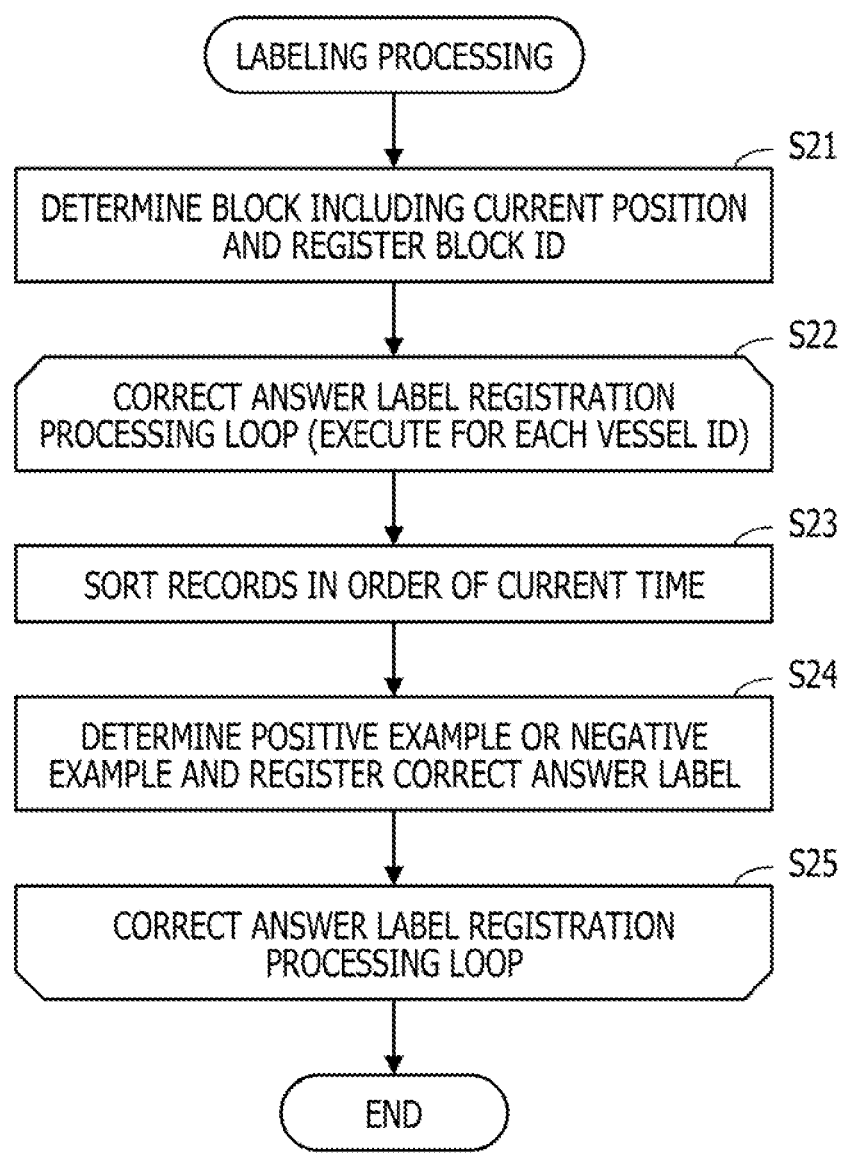
FIG. 9 is an example of a flowchart illustrating a procedure of labeling processing.

FIG. 9 is an example of a flowchart illustrating a procedure of the labeling processing.

[Step S21] The feature data creation unit 131 registers a block ID in each record of the feature database 123. In this processing, the feature data creation unit 131 determines a block including a current position indicated by the latitude and the longitude registered in the record from among blocks registered in the course section database 122 and registers a block ID of the block in the record. Note that, in a case where the current position is not included in any one of the blocks, a specific value (here, assumed as "0") indicating that is registered in the record as the block ID.

[Step S22] The feature data creation unit 131 executes a correct answer label registration processing loop up to step S25 for each vessel ID.

[Step S23] The feature data creation unit 131 collects records in which a vessel ID to be processed is registered, and sorts the records in an ascending order of the current time.

[Step S24] The feature data creation unit 131 sequentially selects the sorted records from the head and determines whether data in each record is a positive example (navigating along course) or a negative example (deviating from course). In a case of determining that the data is the positive example, the feature data creation unit 131 registers "1" as the correct answer label, and in a case of determining that the data is the negative example, the feature data creation unit 131 registers "0" as the correct answer label.

[Step S25] When the processing in steps S23 and S24 is executed on all the vessel IDs, the correct answer label registration processing loop ends.

Figure 10:
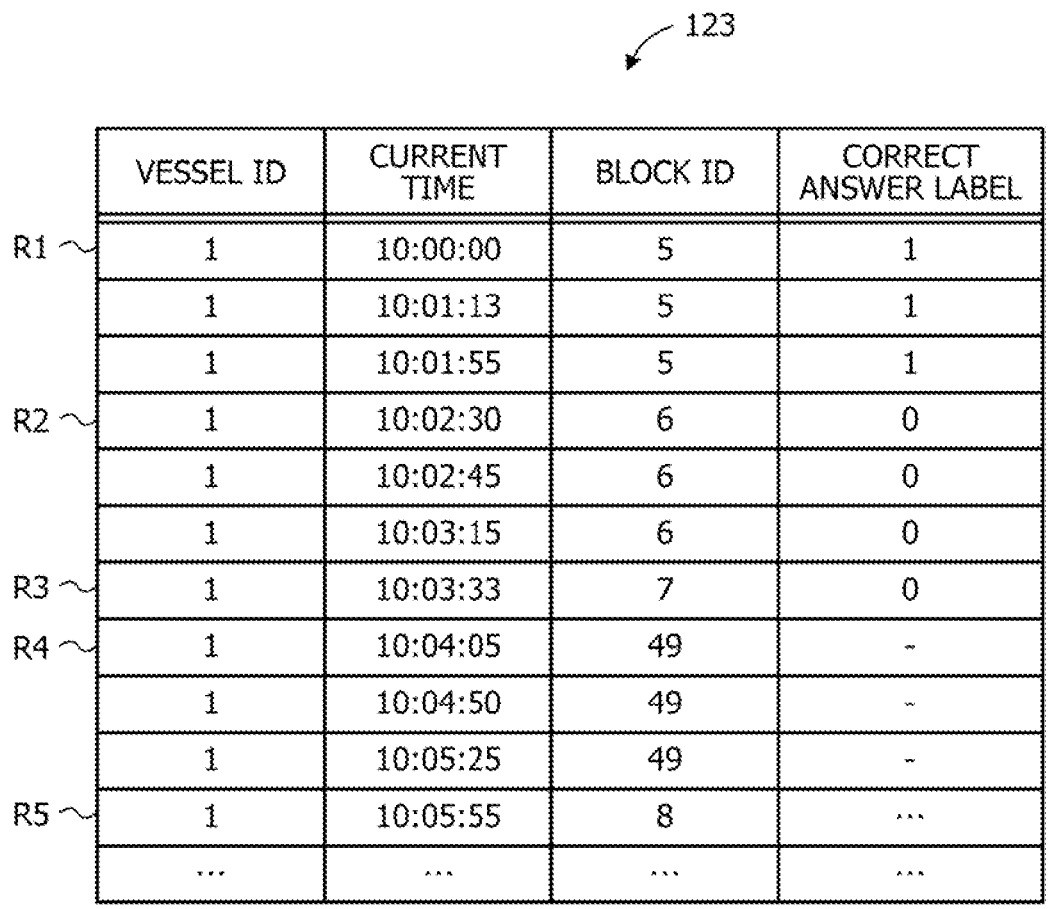
FIG. 10 is a first diagram for explaining positive and negative examples determination processing.

Here, FIG. 10 is a first diagram for explaining positive and negative examples determination processing. In a case where all the following conditions 1 to 3 are satisfied, the feature data creation unit 131 determines that data in a record to be processed as a positive example. Note that, in the following description, the record to be processed is assumed as a "record Rx".

(Condition 1) In records after the record Rx in terms of time, a record (assumed as Ry) exists in which a block ID indicating a block two blocks ahead of a current block indicated by a block ID of the record Rx in the navigation direction is registered.

(Condition 2) There is no record, in which a block ID other than the block ID of the record Rx and the block ID of the next block is registered, between the records Rx and Ry.

In FIG. 10, a case is illustrated in which records with a vessel ID "1" are extracted from the records of the feature database 123. Note that, in FIG. 10, the records are sorted in an ascending order of the current time.

For example, a record R1 in which a block ID "5" is registered is to be processed. In this case, a record R3 in which a block ID "7" indicating a block that is two blocks ahead is registered exists in the later records in terms of time, and the condition 1 described above is satisfied. Furthermore, because there is no record in which a block ID other than the block IDs "5" and "6" is registered between the records R1 and R3, the condition 2 described above is also satisfied. Therefore, data of the record R1 is determined as a positive example, and "1" is registered as a correct answer label of the record R1.

Furthermore, for example, a record R2 in which the block ID "6" is registered is to be processed. In this case, a record R5 in which a block ID "8" indicating a block that is two blocks ahead is registered exists in the later records in terms of time, the condition 1 described above is satisfied. However, a record (for example, record R4) in which a block ID "49" other than the block IDs "6" and "7" is registered exists between the records R2 and R5, and the condition 2 described above is not satisfied. This indicates that the vessel deviates from the course after the block with the block ID "7" and before reaching the block with the block ID "8". In this case, data of the record R2 is determined as a negative example, and "0" is registered as a correct answer label of the record R2.

By the way, in a case where a course is set with respect to a sea area, there is a case where boundaries on both sides of a course area with respect to a navigation direction are not clearly defined. On the other hand, in the setting of the blocks to the course area illustrated in FIG. 5, even in a case where the boundaries on the both sides of the course area are not clearly defined, a width of the block is set according to a certain rule. For example, a rule such that a width of the current block is set on the basis of widths of previous and next blocks or a predetermined certain width is set is applied. However, in an area where the boundaries are not clearly defined, even if the vessel is actually temporarily outside of the block, many vessels continue to navigate along the course thereafter. For example, in a curved portion of the course, the vessel often navigates in a bulging manner to the outer side of the curved portion with respect to the block (for example, right side in a case of being curved leftward).

Therefore, in order to determine the vessel that has navigated in such a way as a positive example, the labeling processing in FIG. 9 may be modified as follows.

Here, the block set to the course section database 122 (block that is not expanded) is described as a "standard block". Then, in this modification, an "expanded block" is defined that is obtained by expanding the standard block by predetermined times from its center line to the width direction (direction perpendicular to navigation direction).

In step S21 in FIG. 9, it is determined whether or not a current position based on a latitude and a longitude of a certain record is included in a range of the standard block and whether or not the current position is included in a range of the expanded block. Here, in a case where the current position is included in the range of the standard block, a block ID of the block is registered as the block ID. On the other hand, in a case where the current position is not included in the range of the standard block and is included in the range of the expanded block, a number in which a symbol "L" is added to a block ID of the block is registered as the block ID.

Then, after the records are sorted in the order of the current time in step S23, the following correction processing is executed on a record of which a block ID indicates the expanded block (record in which "L" is registered in block ID) before the execution of step S24. An enlarged block sandwiched between the standard blocks in the time direction is determined to be similar to the standard block. In this case, the block ID of the record is corrected to indicate the standard block. On the other hand, in a case where there is a record in which a block ID "0" indicating outside of the block is registered at least one side of the record, in which the expanded block is registered, in terms of time, the block ID indicating the expanded block is corrected to "0".

Hereinafter, a specific example of the processing described above will be described with reference to FIGS. 11 and 12. Note that, in FIGS. 11 and 12, a case is illustrated where a record with a vessel ID "1" is extracted from the records of the feature database 123 as in FIG. 10, and the extracted records are sorted in an ascending order of the current time.

Figure 11:
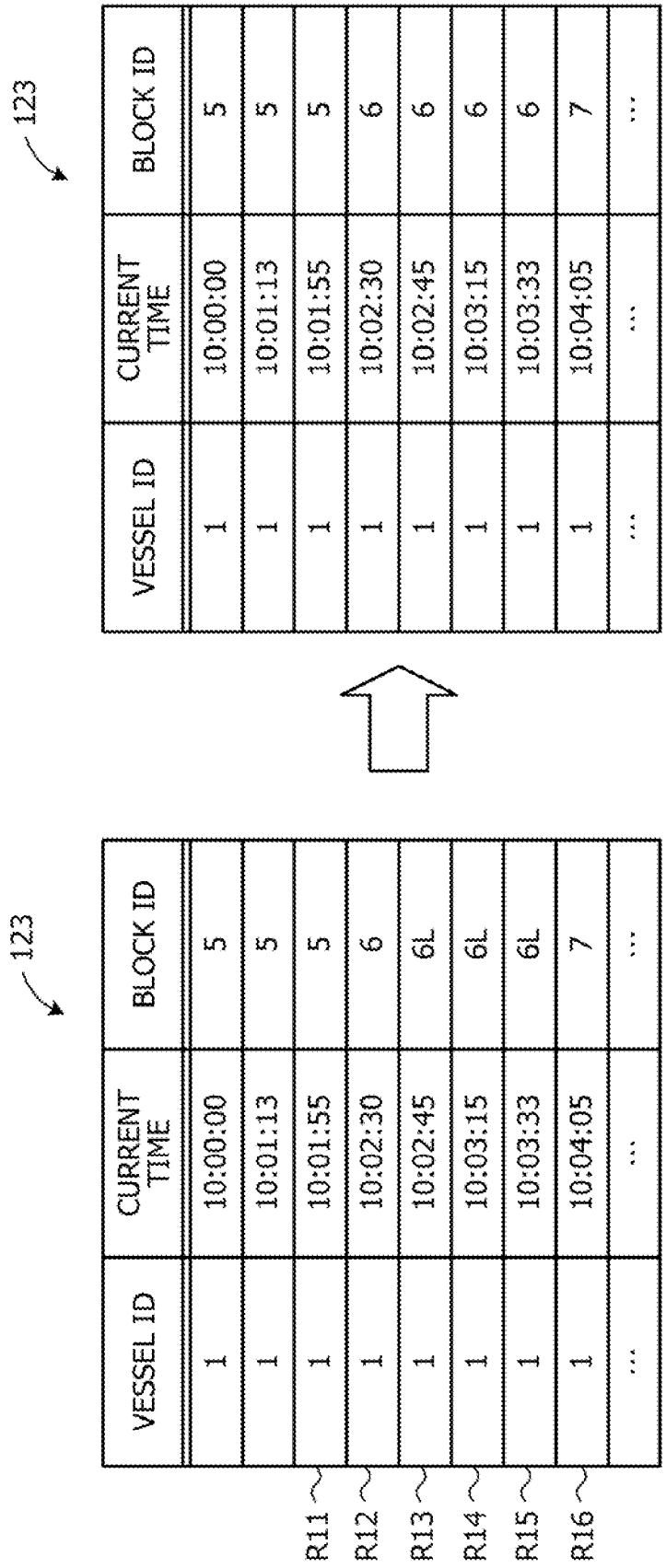
FIG. 11 is a second diagram for explaining the positive and negative examples determination processing.

FIG. 11 is a second diagram for explaining the positive and negative examples determination processing. In the example illustrated in the left side of FIG. 11, in the records R13 to R15, a block ID "6L" indicating the expanded block with the block ID "6" is registered. However, these records R13 to R15 are sandwiched between a record R12 in which the block ID "6" indicating the standard block corresponding to the expanded block is registered and a record R16 in which a block ID "7" indicating a standard block adjacent to the above standard block is registered.

In this case, it is estimated that the vessel has returned to the course area after temporarily slightly deviated from the block with the block ID "6". Therefore, the feature data creation unit 131 corrects the block IDs registered in the records R13 to R15 to the block ID "6" indicating the corresponding standard block as illustrated in the right side of FIG. 11.

As a result, it is assumed that the vessel have navigated in the order of the block with the block ID "5", the block with the block ID "6", and the block with the block ID "7". Therefore, in step S24 in FIG. 9, for example, regarding the record Rh in which the block ID "5" is registered, all of the conditions 1 to 3 described above are satisfied, and "1" is registered as the correct answer label.

Figure 12:
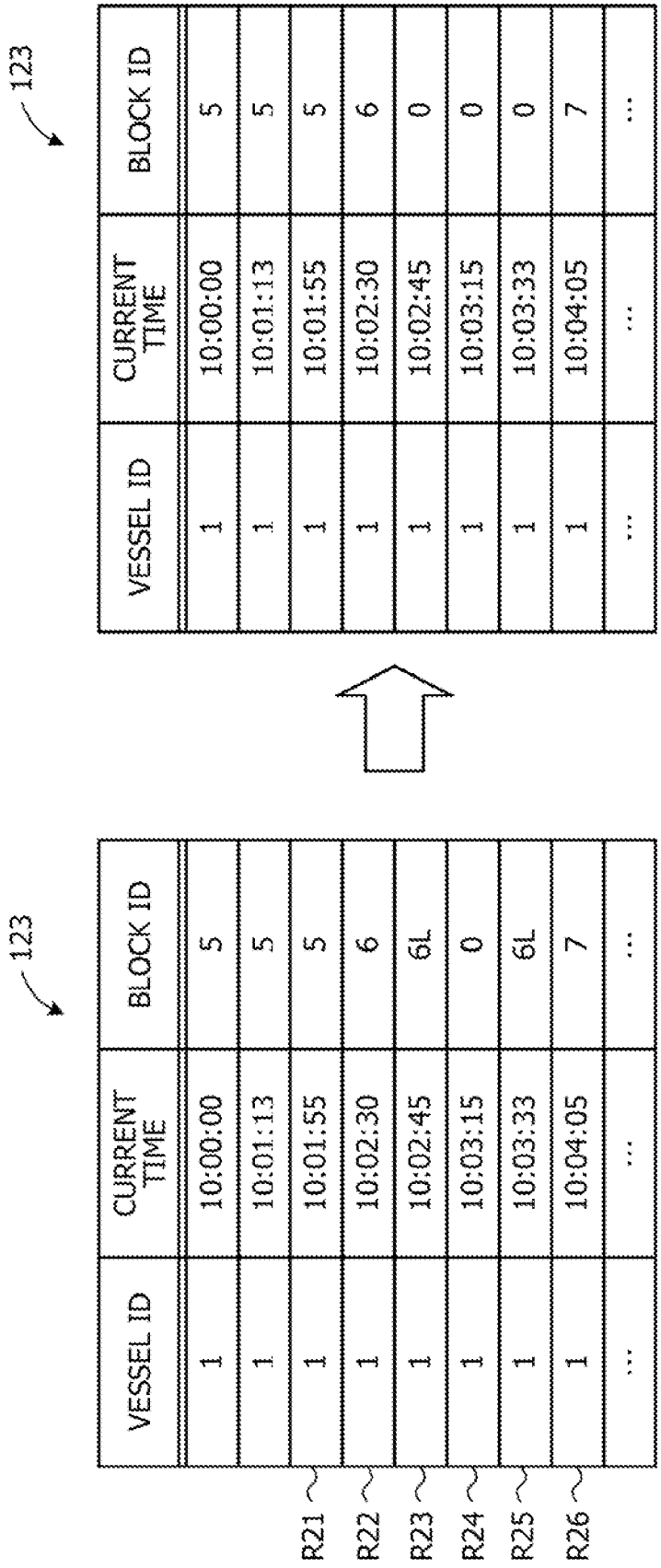
FIG. 12 is a third diagram for explaining the positive and negative examples determination processing.

FIG. 12 is a third diagram for explaining the positive and negative examples determination processing. In the example illustrated in the left side of FIG. 12, in records R23 and R25, the block ID "6L" indicating the expanded block with the block ID "6" is registered. Furthermore, in a record R22 previous to the record R23 in terms of time, the block ID "6" indicating the standard block corresponding to the block ID "6L" is registered, and in a record R26 subsequent to the record R25 in terms of time, the block ID "7" indicating the next standard block of the expanded block with the block ID "6L" is registered. However, in a record R24 adjacent to the records R23 and R25, a block ID "0" indicating outside of the block is registered.

In this case, it is estimated that the vessel has returned to the course area after temporarily largely deviated from the block with the block ID "6". It is not appropriate to assume that the vessel has navigated along the course because the vessel has largely deviated from the course area. Therefore, as illustrated in the right side of FIG. 12, the feature data creation unit 131 corrects the block IDs registered in the records R23 and R25 to the block ID "0" indicating the outside of the block. As a result, in step S24 in FIG. 9, for example, regarding the record R21 in which the block ID "5" is registered, the condition 2 described above is not satisfied, and "0" is registered as the correct answer label.

Hereinafter, the description will be continued with reference to FIG. 8.

[Step S14] The feature data creation unit 131 calculates remaining feature data that is not registered in step S12 and registers the feature data in the feature database 123. For example, the day of week, the time band, the block ID, the block ID at the time of entrance, and the passing flag of the immediately preceding block are calculated and registered in each record of the feature database 123.

Note that, as the block ID at the time of entrance, it is sufficient to register a block ID registered in the head record among the sorted records. Furthermore, in a case where there is a record, in which a block ID smaller than the block ID of the record to be processed by one is registered, in the records previous to the record to be processed in terms of time, it is sufficient that "1" be registered as the passing flag of the immediately preceding block.

Next, in step S15, the navigation state training unit 132 performs training.

[Step S15] The navigation state training unit 132 reads a record of which a block ID is not "0" from the feature database 123. The navigation state training unit 132 sets feature data in each read record as an explanatory variable, performs machine learning using a binary correct answer label as an objective variable, and creates a prediction model for calculating probability values belonging to respective classifications of the positive example and the negative example. The navigation state training unit 132 stores data of the created prediction model in the storage unit 120 as the prediction model data 124.

In this step S15, for example, machine learning using a random forest, gradient boosting, logistic regression, or the like is performed. For example, the random forest of these is suitable in a case where a large number of types of feature data are used for training as illustrated in FIG. 7. In the random forest, a model considering a combination of a plurality of types of feature data is automatically created.

Therefore, for example, it is possible to perform training such that, in a case where the length of the vessel is short and the vessel navigates at high speed, there is a high possibility that the vessel deviates from the course even if a swing width is small.

Furthermore, the random forest is a non-parametric method, and does not have special assumptions or restrictions regarding a distribution of features. For example, angle information such as the course over ground or the heading has a circulation structure such as "−180 degree and 180 degree indicate the substantially same state" or "a difference between 359 degree and zero degree is one". Therefore, in a case where a parametric method is used, appropriate variable conversion is needed. However, in the random forest, inputting an original value does not cause major problems.

Furthermore, many items of the AIS data may include a missing value. For the occurrence of the missing value, generally, a method is used for complementing the missing value on the basis of other records or not using a record including the missing value. Because the random forest is a non-parametric method, the random forest sufficiently functions with the former method. Therefore, it is easy to handle missing values, and obtained records can be effectively used. Note that, the features described above are features that apply to the gradient boosting in addition to the random forest.

By the way, as described above, the information stored in the feature database 123 is created on the basis of the AIS data from the vessel that has actually navigated in the past. In a case where the vessels actually navigate, the number of vessels that deviate from the course is much smaller than the number of vessels that navigate along the course. Therefore, in the feature database 123, the number of negative example records is much smaller than the number of positive example records. Therefore, when training is performed using training data of which a ratio of the negative examples is too small, there is a high possibility that accuracy of the created prediction model is lowered.

For this reason, it is desirable for the navigation state training unit 132 to perform training by undersampling the positive example records stored in the feature database 123. For example, the navigation state training unit 132 thins the positive example records so that the number of positive example records is about 20 times of the number of negative examples, acquires the records, and then, uses the records for training.

<Navigation Monitoring Processing>

Next, navigation monitoring processing for monitoring a vessel under way will be described.

Figure 13:
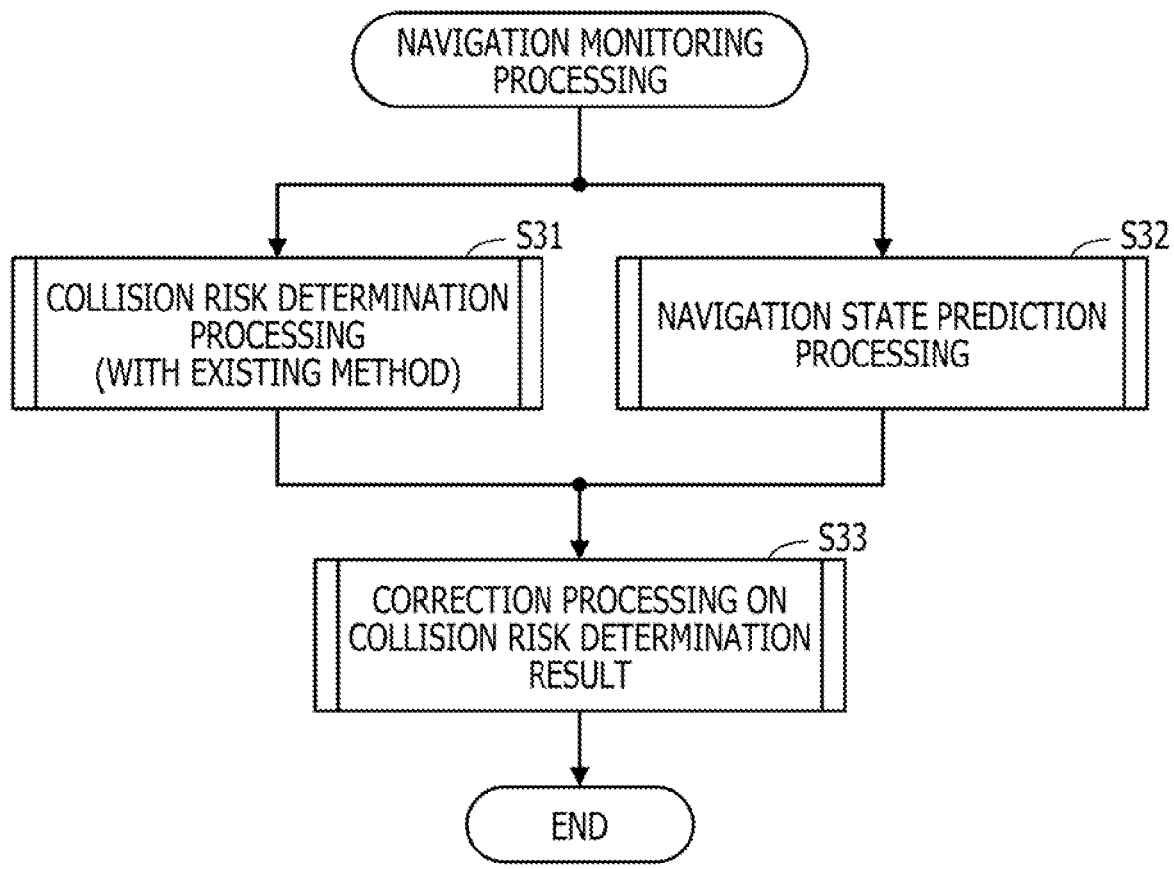
FIG. 13 is an example of a flowchart illustrating an entire procedure of navigation monitoring processing.

FIG. 13 is an example of a flowchart illustrating an entire procedure of the navigation monitoring processing. The processing in FIG. 13 extracts a vessel pair from among a plurality of vessels that is currently navigating and determines a collision risk for each vessel pair. The vessel under way indicates a vessel of which AIS data is received by the wireless communication device 101.

First, the collision risk determination unit 142 determines a collision risk for each vessel pair on the basis of the AIS data acquired from each vessel under way by the AIS data acquisition unit 141 (step S31). In this processing, all combinations of vessel pairs are extracted from among all the vessels under way, and collision risks for all the extracted vessel pairs are determined. As a determination result, for each vessel pair, a collision risk degree that is a quantitative index indicating a degree of the collision risk is output. Alternatively, as the determination result, for each vessel pair, binary data indicating whether or not there is a collision risk may be output. In the latter case, a vessel pair that is determined to have a collision risk may be specified from among the vessel pairs and may be output. These processing by the collision risk determination unit 142 is executed using an existing method.

Furthermore, in parallel to such collision risk determination processing, a navigation state for each vessel under way is predicted by the navigation state prediction unit 144 (step S32). In this processing, feature data of the vessel is created by the feature data creation unit 143 on the basis of the AIS data from the vessel. A method for creating the feature data is similar to the creation method at the time of training by the feature data creation unit 131. The navigation state prediction unit 144 inputs the created feature data into the prediction model based on the prediction model data 124 so as to output a navigation state index indicating a degree that the vessel navigates along the course.

Then, as final processing, the collision risk determination result determined by the collision risk determination unit 142 for each vessel pair is corrected using the prediction result of the navigation state predicted for each vessel included in the vessel pair by the navigation state prediction unit 144 (step S33). For example, in the present embodiment, in order to suppress a possibility of erroneous determination that a collision risk degree is high or there is a collision risk according to the former determination, the correction using the prediction result of the latter is performed.

Next, the collision risk determination processing (step S31 in FIG. 13) by the collision risk determination unit 142 will be described. The collision risk determination unit 142 determines the collision risk, for example, using any one of the following determination methods 1 to 3.

(Determination Method 1) Determination Method Using Extension Vector

Figure 14A:
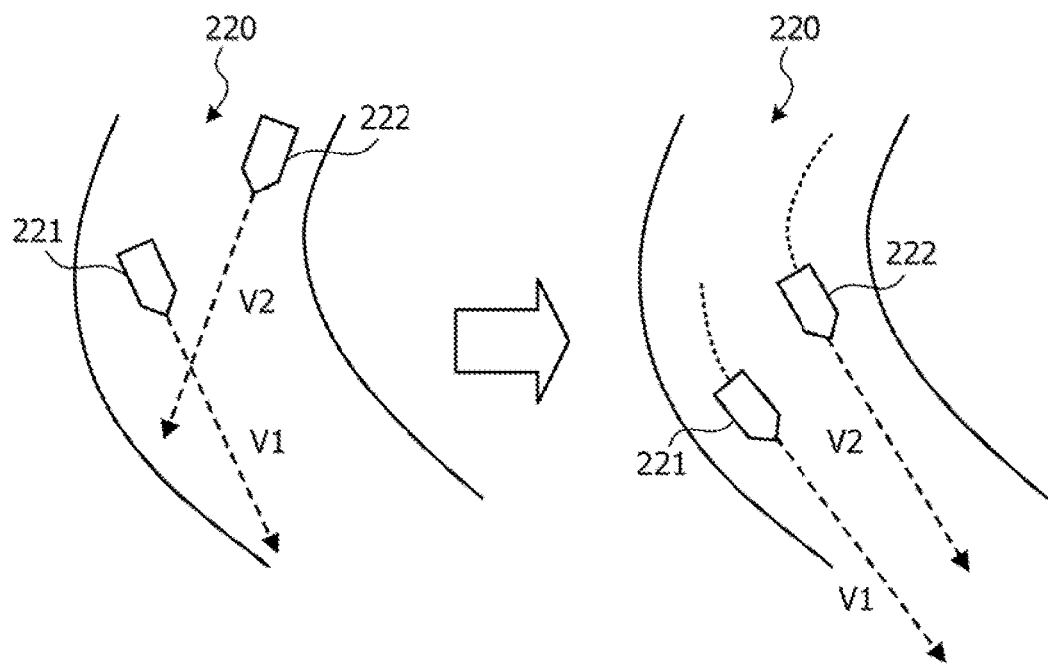
FIGS. 14A and 14B are diagrams illustrating collision risk determination processing using an extension vector.
Figure 14B:
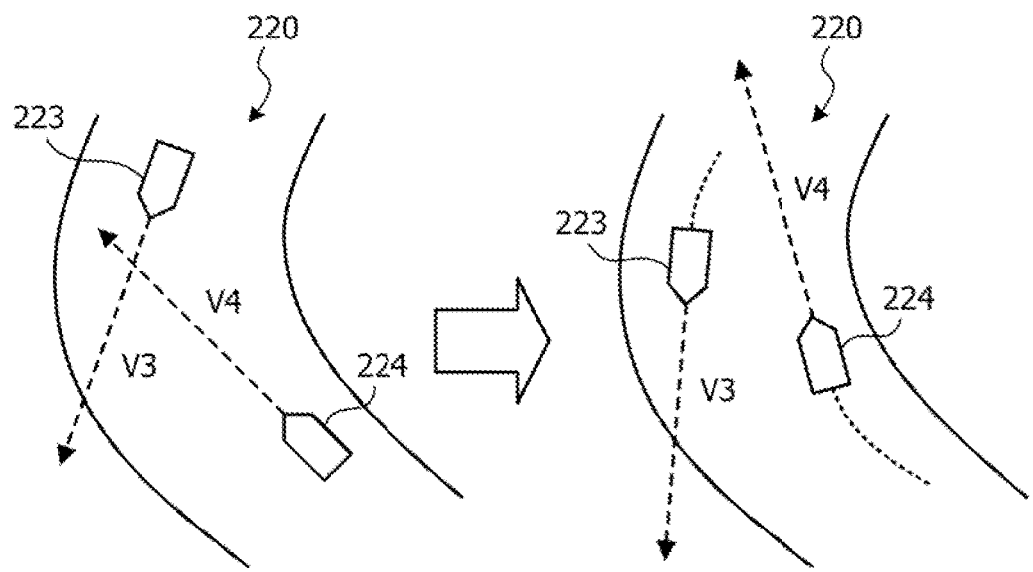

FIGS. 14A and 14B are diagrams illustrating collision risk determination processing using an extension vector. Note that, FIG. 14A illustrates a first example of extension vectors of a vessel pair, and FIG. 14B illustrates a second example of the extension vectors of the vessel pair.

The extension vector is a vector that has a same direction (amplitude) as the course of the vessel (course over ground in the present embodiment) and has a distance from the current position of the vessel to a position where the vessel reaches a predetermined time later (generally, five minutes) in a state where the current speed is maintained as a magnitude. In FIG. 14A, an extension vector V1 of a vessel 221 and an extension vector V2 of a vessel 222 are illustrated. In FIG. 14B, an extension vector V3 of a vessel 223 and an extension vector V4 of a vessel 224 are illustrated.

In the collision risk determination processing using the extension vector, in a case where the extension vectors of the respective vessels of the vessel pair intersect, it is determined that there is a collision risk. In FIG. 14A, the extension vectors V1 and V2 intersect, and it is determined that there is a collision risk between the vessels 221 and 222. In FIG. 14B, the extension vectors V3 and V4 intersect, and it is determined that there is a collision risk between the vessels 223 and 224.

(Determination Method 2) Determination Method Using OZT

Figure 15:
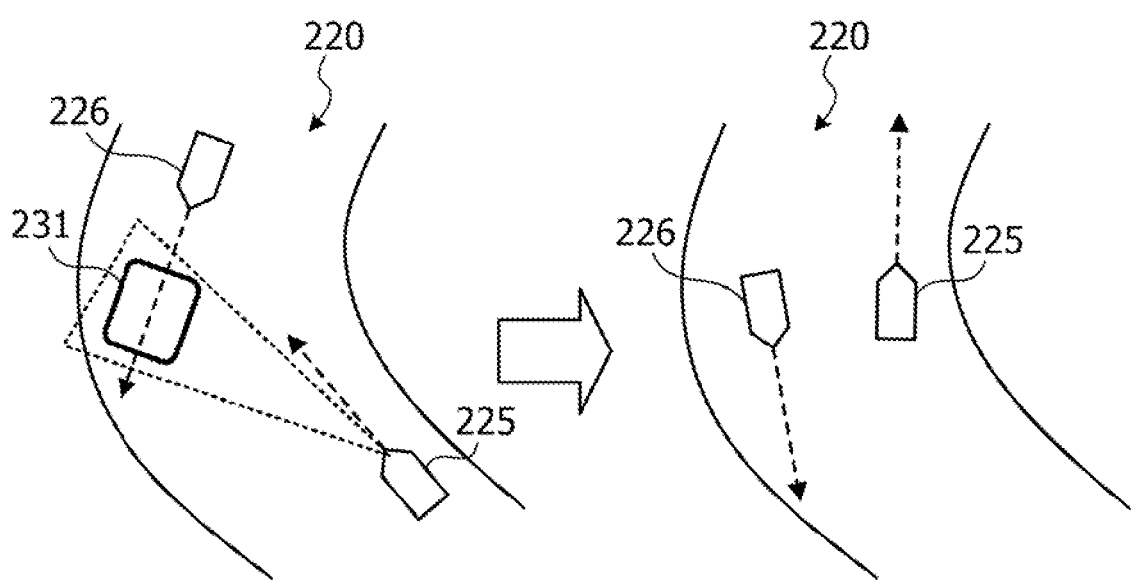
FIG. 15 is a diagram illustrating collision risk determination processing using an obstacle zone by target (OZT)

FIG. 15 is a diagram illustrating collision risk determination processing using an OZT. The obstacle zone by target (OZT) indicates an area where a vessel may collide with another vessel (another vessel) navigating around in a case where it is assumed that the vessel have changed a course.

The OZT is calculated on the basis of the position, the course over ground, the speed over ground, or the like of each vessel. For example, a probability that the own vessel and the another vessel exist at the same position at the same time is calculated in consideration of measurement errors of a vessel speed or the like, and an area of which the probability is equal to or more than a predetermined threshold is determined as the OZT.

In the example in FIG. 15, an OZT 231 is detected between a vessel 225 and a vessel 226 that is the another vessel. In a case where such an OZT 231 is detected, it may be determined that there is a collision risk between a pair of the vessels 225 and 226.

(Determination Method 3) Determination Method Using TCPA and DCPA

Figure 16:
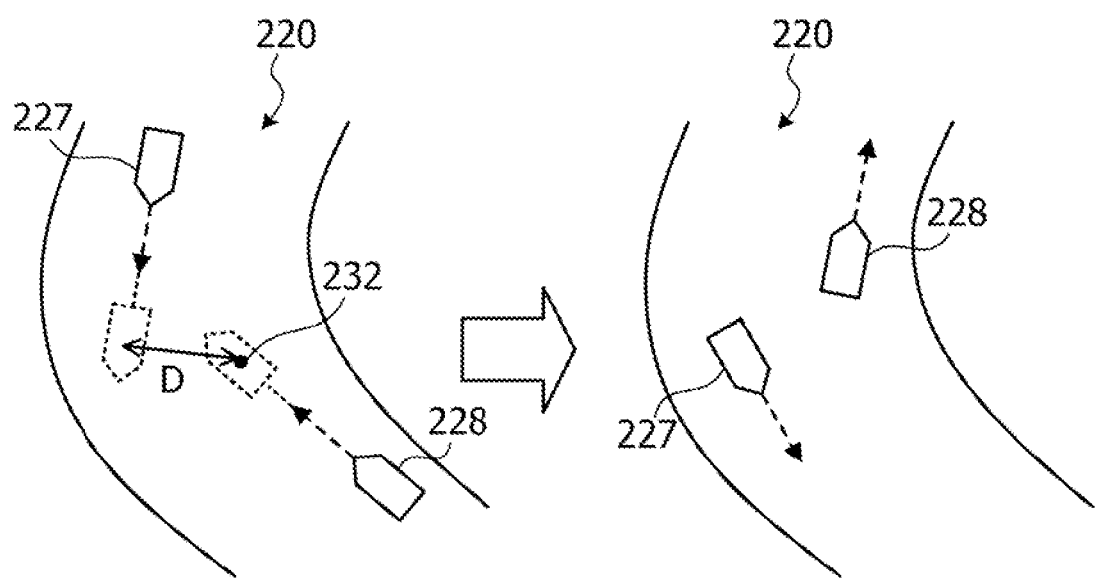
FIG. 16 is a diagram illustrating collision risk determination processing using a distance to closest point of approach (DCPA) and a time to closest point of approach (TCPA)

FIG. 16 is a diagram illustrating collision risk determination processing using a DCPA and a TCPA. In the determination methods 1 and 2 described above, binary data indicating whether or not there is a collision risk is output. On the other hand, there is a method for calculating a quantitative index (collision risk degree) indicating a degree of a collision risk using the DCPA and the TCPA.

In this method, a closest point of approach (CPA) at which the another vessel is closest to the own vessel is obtained from relative motions based on navigation record data of each vessel of the vessel pair. Then, a distance to closest point of approach (DCPA) from the own vessel to the CPA and a time to closest point of approach (TCPA) indicating a time until the another vessel reaches the CPA are calculated. In FIG. 16, a case is illustrated where a CPA 232 is detected between a vessel 227 and a vessel 228 that is another vessel and a distance D is calculated as the DCPA.

The collision risk degree can be calculated using at least one of the DCPA and the TCPA. Basically, as the DCPA is shorter, or as the TCPA is shorter, a higher value is output as the collision risk degree. Furthermore, the techniques for calculating the collision risk degree by combining the DCPA and the TCPA include, for example, "KUBOTA, Takashi and KOUGUCHI, Nobuyoshi, "Navigator's decision-making and action model II—Synthetically subjective risk of collision—", *The journal of Japan Institute of Navigation*, pp. 21 to 26, March 2010", "Chin, Hoong Chor and Debnath, Ashim, "Modeling perceived collision risk in port water navigation", *Safety Science*, 47(10), pp. 1410 to 1416, 2009", or the like.

By the way, the extension vectors, the DCPA, the TCPA, and the OZT are information obtained as assuming that a vessel basically navigates in a straight line. Because the determination methods 1 to 3 described above are methods based on these pieces of information, there is a problem in that determination accuracy is deteriorated in a case where each vessel of the vessel pair navigates, for example, in a curved course.

For example, in FIG. 14A, a case is illustrated where the vessels 221 and 222 navigate in the same direction in a curved course area 220. In a state illustrated in the left side of FIG. 14A, because the extension vector V1 of the vessel 221 and the extension vector V2 of the vessel 222 intersect, it is determined that there is a collision possibility between the vessels 221 and 222. However, in a case where both of the vessels 221 and 222 navigate along the courses, as in the example on the right side of FIG. 14A, the vessels 221 and 222 do not collide, and a state where the extension vectors V1 and V2 intersect will be resolved.

Furthermore, in FIG. 14B, a case is illustrated where the vessels 223 and 224 navigate as facing each other in the same course area 220. In a state illustrated in the left side of FIG. 14B, because the extension vector V3 of the vessel 223 and the extension vector V4 of the vessel 224 intersect, it is determined that there is a collision possibility between the vessels 223 and 224. However, in a case where both of the vessels 223 and 224 navigate along the courses, as in the example on the right side of FIG. 14B, the vessels 223 and 224 pass each other without colliding with each other, and a state where the extension vectors V3 and V4 intersect will be resolved.

In this way, the extension vector is a vector that linearly extends in the course direction. Therefore, in a case where the vessel pair approaches the curved portion of the course at the same time, there is a possibility that the extension vectors temporarily intersect even in a state where the vessel pair safely navigates without collision. Therefore, there is a case where a vessel pair that is safely navigating without collision is erroneously detected as a vessel pair having a collision possibility. For example, the determination method using the extension vector has high accuracy for detecting a collision risk between a vessel on a course and a vessel crossing the course. However, the curved portion of the course has features such that it is difficult in this way to distinguish a case where crossing a course by a vessel causes a collision risk from a case where both vessels navigate along courses.

Furthermore, in FIG. 15, a case is illustrated where the vessels 225 and 226 navigate as facing each other in the same course area 220. In a state illustrated on the left side of FIG. 15, the OZT 231 is detected between the vessels 225 and 226. However, in a case where both of the vessels 225 and 226 navigate along the courses, as in the example on the right side of FIG. 15, the vessels 225 and 226 pass each other without collision.

In the OZT, a case is assumed where one vessel changes the course at the current time, and a movement of the vessel thereafter is estimated as a linear movement. As in the example in FIG. 15, when the OZT is calculated between the vessels that are approaching before the curved portion of the course, a dangerous area is detected in a destination to which the course is changed from the current location. However, in a case where each vessel navigates along the course, the course is changed after the vessel navigates a little farther. Therefore, each vessel does not enter the detected dangerous area. Therefore, there is a case where a dangerous area that does not intrinsically need to be bewared is detected and erroneous determination indicating that there is a collision risk is made from the detection result.

Moreover, in FIG. 16, a case is illustrated where the vessels 227 and 228 navigate as facing each other in the same course area 220. In a state illustrated on the left side of FIG. 16, the distance D is calculated as the DCPA between the vessels 227 and 228. However, this distance D is short, and a relatively high value is calculated as the collision risk degree. However, in a case where both of the vessels 227 and 228 navigate along the courses, as in the example on the right side of FIG. 16, the vessels 227 and 228 pass each other without collision.

The DCPA and the TCPA are calculated on the assumption that the course and the speed are maintained from the current location. Therefore, as in the example in FIG. 16, a value tends to be smaller in the curved portion of the course, and the collision risk degree is easily calculated to be higher.

As described above, in the determination methods 1 to 3, there is a problem in that, in a case where each vessel of the vessel pair navigates in the curved course, erroneous determination indicating that there is a collision risk is easily made or the collision risk degree tends to be calculated to be higher than actual. Therefore, in the present embodiment, determination accuracy is improved by correcting the determination result by the collision risk determination unit 142 using the prediction result by the navigation state prediction unit 144. The navigation state prediction unit 144 calculates a determination result whether or not each vessel navigates along a course or a navigation state index indicating a degree (possibility) that the vessel navigates along the course.

For example, even in a case where it is erroneously determined that the vessel pair has a collision risk as described above, it is possible to determine again that there is no collision risk in a case where each vessel navigates along the course. Furthermore, for example, even in a case where the collision risk degree of the vessel pair is calculated to be higher than actual as described above, in a case where the navigation state index regarding each vessel is high (there is high possibility that vessel continues to navigate along course), the collision risk degree can be corrected to be low. In this way, an occurrence possibility of the erroneous determination of the collision risk or a state where the collision risk degree is calculated to be higher than actual is suppressed.

Next, navigation state determination processing (step S32 in FIG. 13) by the navigation state prediction unit 144 will be described.

Figure 17:
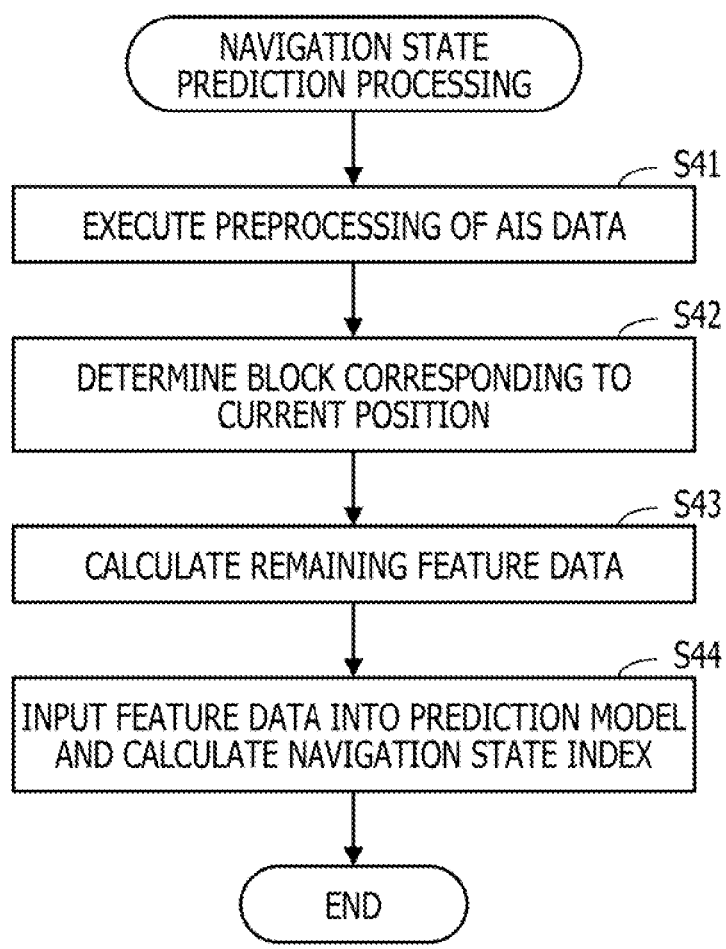
FIG. 17 is an example of a flowchart illustrating a procedure of navigation state prediction processing.

FIG. 17 is an example of a flowchart illustrating a procedure of the navigation state prediction processing.

[Step S41] The feature data creation unit 143 acquires the AIS data transmitted from the vessel under way from the AIS data acquisition unit 141 and executes preprocessing on the AIS data. In this preprocessing, the feature data creation unit 143 integrates static information and navigation related information with dynamic information to be the base, and creates a single feature data record.

For example, a vessel ID, a current time, a latitude, a longitude, course over ground, heading, and a rate of turn included in the transmitted dynamic information are registered in a new feature data record. Furthermore, a destination and a draft are extracted from the latest navigation related information including the same vessel ID and are registered in the same feature data record. Moreover, a vessel type and a length of the vessel are extracted from the latest static information including the same vessel ID and are registered in the same feature data record. Note that, as at the time of training, the static information may be registered in the feature data record after correcting missing data or value variation on the basis of a plurality of pieces of static information including the same vessel ID transmitted up to the current time.

[Step S42] The feature data creation unit 143 determines a block including the current position indicated by the latitude and the longitude registered in the feature data record from among the blocks registered in the course section database 122 and registers a block ID of the block in the feature data record. Note that, in a case where the current position is not included in any one of the blocks, a specific value (here, "0") indicating that is registered in the feature data record as a block ID.

[Step S43] The feature data creation unit 143 calculates remaining feature data that is not registered in steps S41 and S42 and registers the feature data in the feature data record. For example, a day of week, a time band, a block ID, a block ID at the time of entrance, a passing flag of an immediately preceding block are calculated and registered in the feature data record.

Note that the block ID at the time of entrance and the passing flag of the immediately preceding block are calculated on the basis of data of a record, in which the vessel ID registered in the feature data record is registered, among the records accumulated in the feature database 125. Furthermore, the feature data creation unit 143 additionally registers a feature data record, in which all the feature data is registered, in the feature database 125 as a new record.

Note that, as described later, only a part of the feature data illustrated in FIG. 7 may be used at the time of training the navigation state. In steps S41 to S43, the feature data of the same type as the feature data created at the time of training is created.

[Step S44] This step S44 is executed in a case where the block ID of the feature data record is not "0". The navigation state prediction unit 144 inputs the feature data in the feature data record into the prediction model based on the prediction model data 124 and predicts whether or not the vessel navigates along the course. Through this processing, at least a probability (navigation state index) such that the vessel navigates along the course is calculated. In addition to this, a probability such that the vessel does not navigate along the course (deviate from course) may be calculated.

Furthermore, the navigation state prediction unit 144 may output a binary determination value indicating whether or not the vessel navigates along the course on the basis of the calculated probability. This binary determination value is calculated, for example, according to whether or not the navigation state index exceeds a predetermined threshold. In a case where the navigation state index exceeds the threshold, the binary determination value is set to "1" indicating a determination result that the vessel navigates along the course, and in a case where the navigation state index is equal to or less than the threshold, the binary determination value is set to "0" indicating a determination result that the vessel does not navigate along the course (deviate from course).

Here, contribution of the feature data to the prediction of the navigation state will be described.

Not all of the feature data illustrated in FIG. 7 is essential for training of the prediction model and the prediction using the prediction model. However, as the feature data, at least the direction information indicating the direction of the vessel and the position information indicating the position of the vessel are used. As a result, a prediction model considering a relationship between the direction and the position of the vessel is generated, and it is possible to perform prediction with certain accuracy or higher regardless of whether or not the course is curved, by using this prediction model. Therefore, it can be accurately predicted whether or not the vessel navigates along the course.

As the direction information, for example, at least one of the course over ground and the heading is used. However, the course over ground that more accuracy grasps the direction of the vessel more largely contributes to prediction accuracy.

Furthermore, as the position information, at least one of the block ID and the latitude and longitude is used. However, by using both of these, a prediction model considering a relative position of the vessel in the block area is generated. For example, when the vessel passes near the center of the block, a possibility that the vessel navigates along the course thereafter is higher than that in a case where the vessel passes through a position on the outer side (lateral direction) with respect to the navigation direction in the block. By using both of the block ID and the latitude and longitude, highly accurate prediction can be made in consideration of such characteristics.

Furthermore, both of the latitude and the longitude do not need to be used, and only one of them may be used. For example, in the course extending from the north to the south as in the example in FIG. 5, the longitude more largely contributes to the prediction accuracy than the latitude. This is because, as described above, the characteristics is considered that the possibility that the vessel continues to navigate along the course changes depending on whether or not the vessel passes through the center of the block or the vessel passes through the position on the outer side (east-west direction in this case) with respect to the navigation direction. Therefore, for example, in the course extending from the north to the south, only the longitude of the latitude and the longitude may be used as the feature data.

Furthermore, as other feature data, for example, the destination has a relatively high contribution degree. For example, in a case where the course is branched in the middle as in the example in FIG. 5, the destination largely contributes to improve the prediction accuracy in a block immediately before the branch.

Furthermore, because the block ID at the time of entrance and the passing flag of the immediately preceding block are information indicating a most recent navigation pattern, the block ID at the time of entrance and the passing flag have relatively high contribution degrees to the prediction accuracy. For example, by using the block ID at the time of entrance and the passing flag of the immediately preceding block, a prediction model considering the most recent navigation pattern is generated.

Furthermore, for example, contribution of information related to the size of the vessel such as the vessel type, the length of the vessel, or the draft is relatively large. This is because the navigation pattern differs according to the size of the vessel. For example, by using these pieces of data, a prediction model considering the difference in the navigation pattern according to the size of the vessel is generated.

Next, determination result correction processing (step S33 in FIG. 13) by the determination result correction unit 145 will be described. In this correction processing, the collision risk determination result by the collision risk determination unit 142 is corrected according to the navigation state prediction result by the navigation state prediction unit 144.

Here, first, a case where a collision risk degree of the vessel pair is calculated by the collision risk determination unit 142 and a navigation state index of each vessel included in the vessel pair is calculated by the navigation state prediction unit 144 will be described with reference to FIG. 18.

Figure 18:
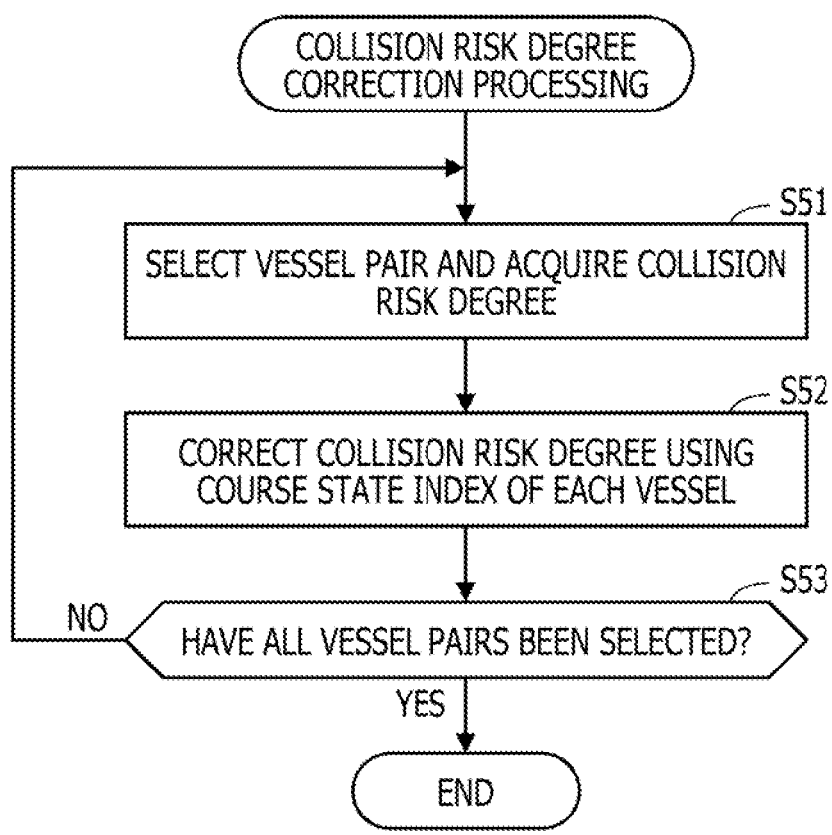
FIG. 18 is an example of a flowchart illustrating a collision risk degree correction processing procedure.

FIG. 18 is an example of a flowchart illustrating a correction processing procedure of a collision risk degree.

[Step S51] The determination result correction unit 145 selects one pair from among the vessel pairs of which the collision risk degrees are calculated by the collision risk determination unit 142, and acquires a collision risk degree of the selected vessel pair.

[Step S52] The determination result correction unit 145 acquires a course state index for each vessel included in the selected vessel pair and corrects the collision risk degree according to the acquired course state index. For example, the correction is performed using the following formula (1).

$$R_{adj} = (1-\alpha) \times R_{org} \times (1 P_A \times P_B) \pm \alpha \times R_{org} \quad (1)$$

In the formula (1), $R_{org}$ indicates a collision risk degree before correction for a vessel pair, and $R_{adj}$ indicates a collision risk degree after correction. $P_A$ indicates a navigation state index for one vessel of the vessel pair, and $P_B$ indicates a navigation state index for another vessel. However, it is assumed that $R_{org}$, $P_A$, and $P_B$ be assigned to the formula (1) in a state where all of $R_{org}$, $P_A$, and $P_B$ are normalized to a value equal to or more than zero and equal to or less than one. The reference a is a weighting coefficient that is arbitrarily set and is a value equal to or more than zero and equal to or less than one.

[Step S53] The determination result correction unit 145 determines whether or not all the vessel pairs of which the collision risk degrees are calculated by the collision risk determination unit 142 are selected in step S51. In a case where there is an unselected vessel pair, the processing proceeds to step S51, and one pair is selected from among the unselected vessel pairs. On the other hand, in a case where there is no unselected vessel pair, the correction processing ends.

According to the above processing, as the navigation state index indicating the probability that the vessel navigates along the course is higher, the collision risk degree is corrected to be lower. As a result, it is possible to reduce a possibility to erroneously determine that the vessel pair that is navigating in the curved portion of the course or the like has a collision risk, and the collision risk determination accuracy can be improved.

Note that the correction method described above using the formula (1) is an example and is not limited to this.

Next, a case where the collision risk determination unit 142 determines whether or not the vessel pair has a collision risk and a binary determination value indicating whether each vessel included in the vessel pair navigates along the course is calculated by the navigation state prediction unit 144 will be described with reference to FIG. 19.

Figure 19:
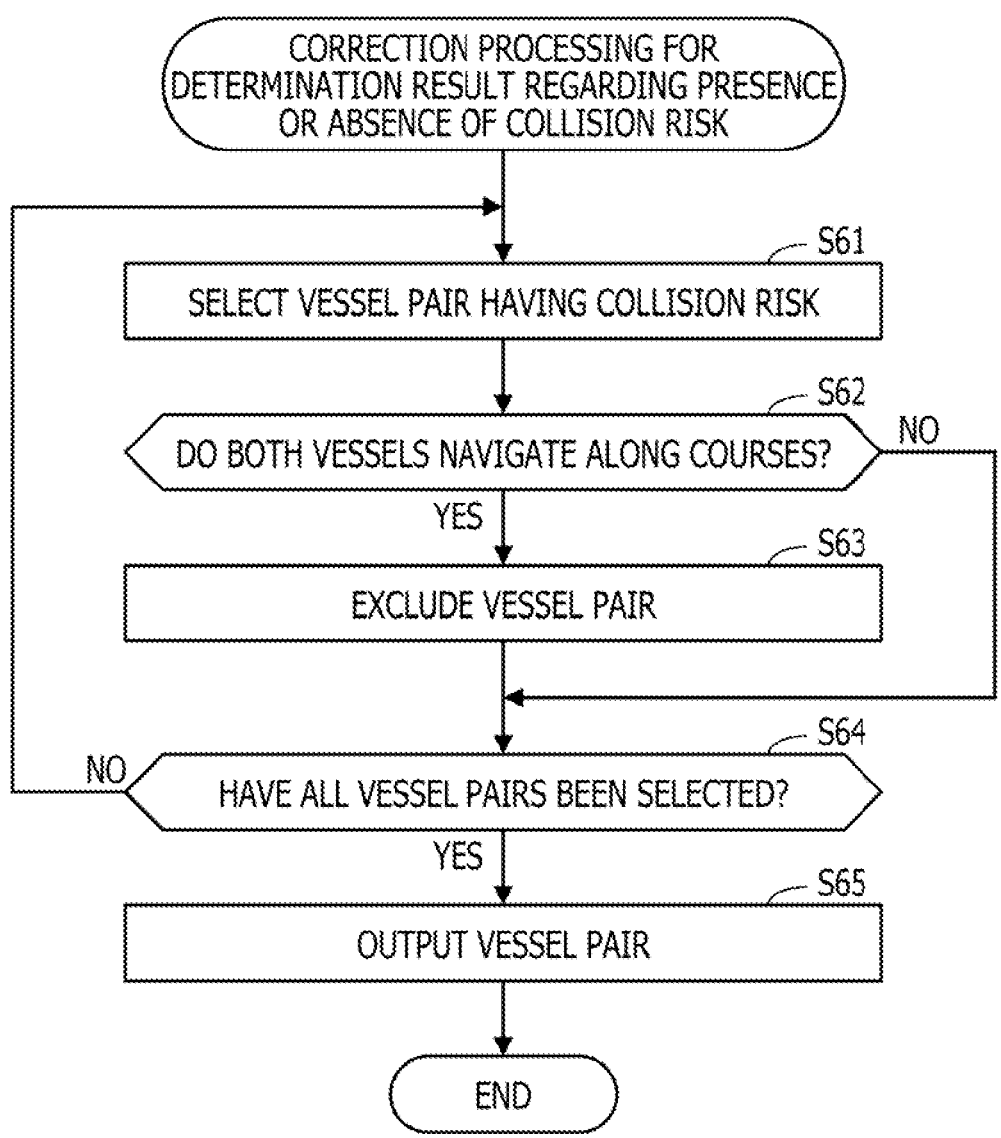
FIG. 19 is an example of a flowchart illustrating a correction processing procedure for a determination result regarding presence or absence of a collision risk.

FIG. 19 is an example of a flowchart illustrating a correction processing procedure for a determination result regarding presence or absence of a collision risk. In FIG. 19, a case will be described where a vessel pair that is determined to have a collision risk (high) from among vessels currently navigating is output. At the time when the processing in FIG. 19 starts, it is assumed that information indicating each vessel pair determined to have a collision risk by the collision risk determination unit 142 be registered in vessel pair information (not illustrated) stored in the storage unit 120.

[Step S61] The determination result correction unit 145 selects one pair from among the vessel pairs determined to have a collision risk by the collision risk determination unit 142.

[Step S62] The determination result correction unit 145 acquires a binary determination value indicating whether or not each vessel included in the selected vessel pair navigates along the course, from the navigation state prediction unit 144. The determination result correction unit 145 determines whether or not both vessels included in the vessel pair navigate along the courses on the basis of the acquired binary determination value. In a case where both vessels navigate along the courses, the processing proceeds to step S63, and in a case where at least one vessel does not navigate along the course, the processing proceeds to step S64.

[Step S63] The determination result correction unit 145 excludes the vessel pair selected in step S61 from the vessel pair information described above.

[Step S64] The determination result correction unit 145 determines whether or not all the vessel pairs that are determined to have a collision risk by the collision risk determination unit 142 have been selected in step S61. In a case where there is an unselected vessel pair, the processing proceeds to step S61, and one pair is selected from among the unselected vessel pairs. On the other hand, in a case where there is no unselected vessel pair, the processing proceeds to step S65.

[Step S65] The determination result correction unit 145 finally outputs the vessel pair remaining in the vessel pair information as a pair of vessels having a collision risk. For example, the determination result correction unit 145 generates display information in which the information indicating these vessel pairs is drawn, transmits the display information to the navigation monitoring device 102 or another device (for example, device mounted on vessel under way), and makes the device display an image based on the display information.

According to the above processing, even in a case where a certain vessel pair is determined to have a collision risk by the collision risk determination unit 142, in a case where the navigation state prediction unit 144 predicts that both vessels included in the vessel pair navigate along the courses, it is determined that there is no collision risk. As a result, it is possible to reduce a possibility to erroneously determine that the vessel pair that is navigating in the curved portion of the course or the like has a collision risk, and the collision risk determination accuracy can be improved.

Note that the correction method described above is an example and is not limited to this. For example, correction for the determination result of the OZT with the determination method 2 described above can be performed as follows. In a case where an OZT is detected between a certain vessel and another vessel, a binary determination value regarding these two vessels is acquired from the navigation state prediction unit 144. In a case where it is determined that both vessels navigate along the courses from the binary determination value, it is determined that the OZT is erroneously detected, and the determination result is changed to "no OZT".

Third Embodiment

In the second embodiment described above, a common prediction model for all blocks in a course area is created, and a navigation state of a vessel under way is predicted using this prediction model. On the other hand, in a third embodiment below, an individual prediction model is created for each block.

Figure 20:
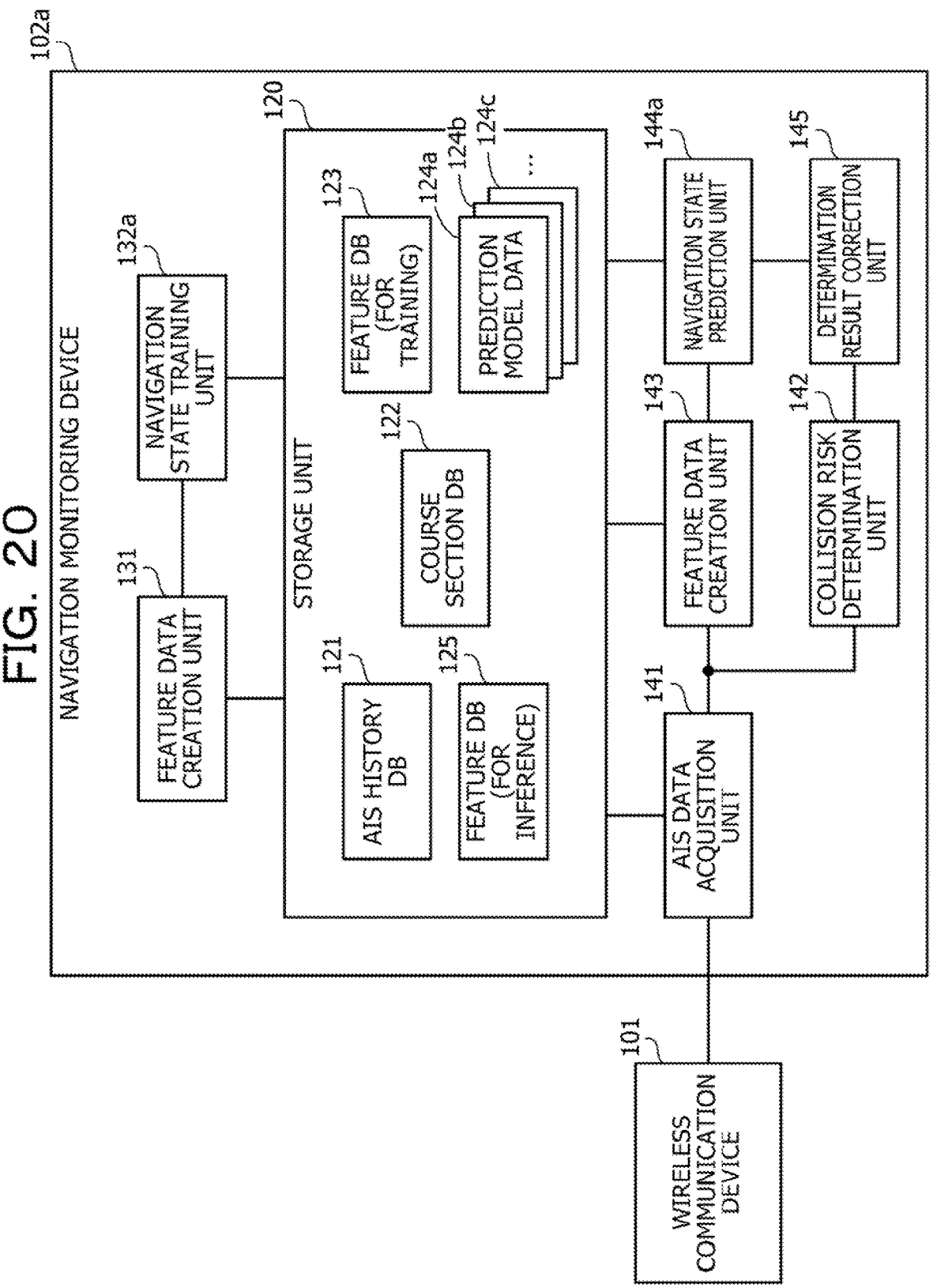
FIG. 20 is a diagram illustrating a configuration example of a processing function included in a navigation monitoring device according to a third embodiment.

FIG. 20 is a diagram illustrating a configuration example of a processing function included in a navigation monitoring device according to the third embodiment. Note that, in FIG. 20, the processing functions and the data same as those in FIG. 4 are denoted with the same reference numerals, and description thereof will be omitted.

A navigation monitoring device 102a illustrated in FIG. 20 includes a navigation state training unit 132a instead of the navigation state training unit 132 and includes a navigation state prediction unit 144a instead of the navigation state prediction unit 144, among the processing functions included in the navigation monitoring device 102 illustrated in FIG. 4. Furthermore, a storage unit 120 stores prediction model data 124a, 124b, 124c, . . . respectively corresponding to different blocks, instead of the prediction model data 124 common to all the blocks.

The navigation state training unit 132a reads a record registered in a feature database 123 for each block ID and creates a prediction model corresponding to the block ID through training using a record in which the same block ID is registered. As a result, the prediction model data 124a, 124b, 124c, . . . indicating the prediction models for the respective blocks is created and stored in the storage unit 120.

When acquiring a feature data record regarding a vessel to be predicted, the navigation state prediction unit 144a reads a block ID from the feature data record. The navigation state prediction unit 144a acquires prediction model data corresponding to the read block ID from among the prediction model data 124a, 124b, 124c, . . . stored in the storage unit 120. The navigation state prediction unit 144a inputs feature data included in the feature data record to a prediction model based on the acquired prediction model data and predicts a course state of a vessel.

Figure 21:
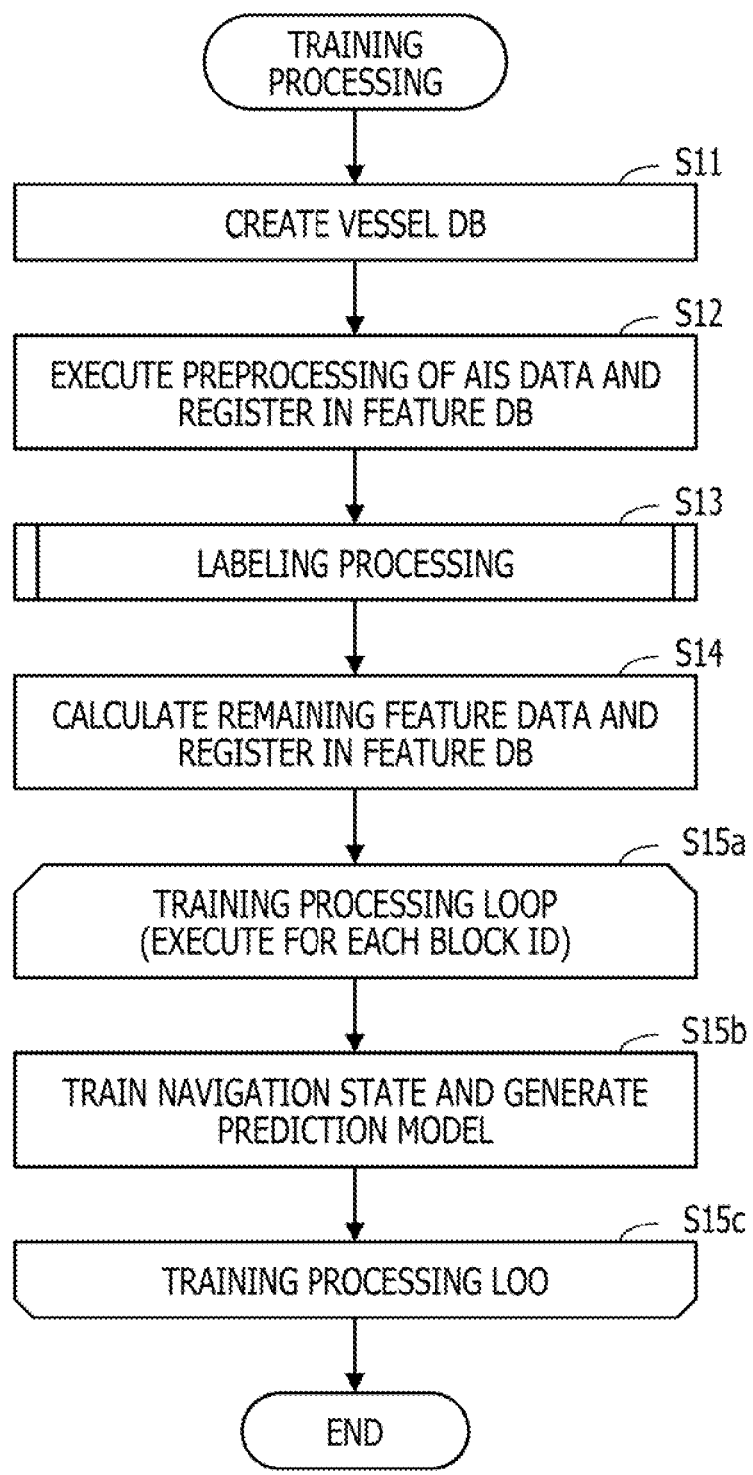
FIG. 21 is an example of a flowchart illustrating a training processing procedure of a navigation state according to the third embodiment.

FIG. 21 is an example of a flowchart illustrating a training processing procedure of a navigation state according to the third embodiment. Note that, in FIG. 21, the step having processing content same as that in FIG. 8 is denoted with the same step number, and description thereof will be omitted.

[Step S15a] The navigation state training unit 132a executes a training processing loop up to step S15c for each block ID.

[Step S15b] The navigation state training unit 132a reads a record in which a block ID to be processed is registered from the feature database 123. The navigation state training unit 132a sets feature data in each read record as an explanatory variable, performs machine learning using a binary correct answer label as an objective variable, and creates a prediction model for calculating probability values belonging to respective classifications of a positive example and a negative example. However, of the feature data in each record, the block ID is not used for machine learning. The navigation state training unit 132a stores data of the created prediction model in the storage unit 120 as prediction model data. Note that, as a method of machine learning, for example, random forest, gradient boosting, logistic regression, or the like can be used as in step S15 in FIG. 8.

[Step S15c] When the processing in step S15b is executed on all the block IDs other than a block ID "0", the training processing loop ends.

Figure 22:
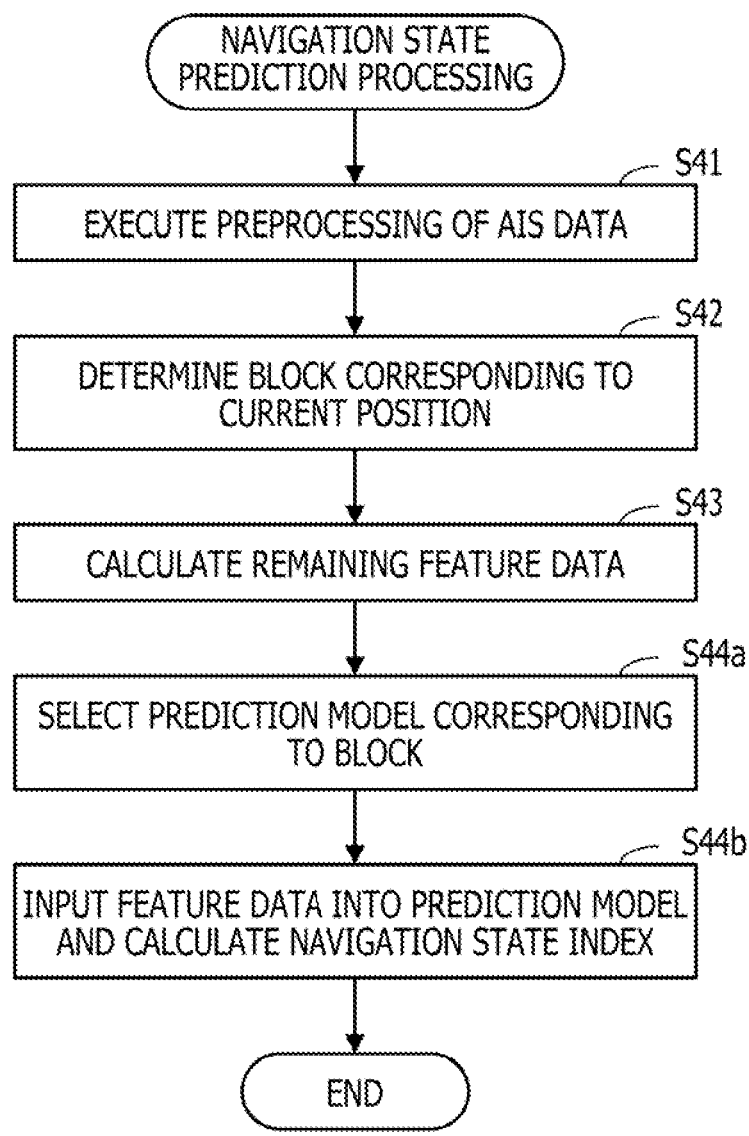
FIG. 22 is an example of a flowchart illustrating a procedure of navigation state prediction processing according to the third embodiment.

FIG. 22 is an example of a flowchart illustrating a procedure of navigation state prediction processing according to the third embodiment. In FIG. 22, the step having processing content same as that in FIG. 17 is denoted with the same step number, and description thereof will be omitted.

[Step S44a] Processing in this step S44a and subsequent steps is executed in a case where the block ID of the feature data record is not "0". The navigation state prediction unit 144a reads a block ID from the feature data record and selects prediction model data corresponding to the read block ID from among the prediction model data 124a, 124b, 124c, . . . stored in the storage unit 120.

[Step S44b] The navigation state prediction unit 144a inputs the feature data in the feature data record into a prediction model based on the selected prediction model data and predicts whether or not the vessel navigates along the course. However, of the feature data in the feature data record, the block ID is not input to the prediction model.

As in step S44 in FIG. 17, in step S44b described above, at least a probability (navigation state index) such that the vessel navigates along the course is calculated. In addition to this, a probability such that the vessel does not navigate along the course (deviate from course) may be calculated. Furthermore, the navigation state prediction unit 144a may output a binary determination value indicating whether or not the vessel navigates along the course on the basis of the calculated probability.

In the third embodiment above, prediction accuracy substantially similar to that in a case where the prediction model common to the blocks as in the second embodiment is trained using the block ID as a feature. Furthermore, because the number of pieces of training data used to train each prediction model for each block is reduced, there is a high possibility that a time needed for training as a whole can be shortened.

Furthermore, for example, only for a block in a region, in which collision risk determination accuracy is lowered, such as a curved portion of the blocks in the course area, the prediction model may be created. Then, regarding only the vessel that has reached the block, the navigation state is predicted using the corresponding prediction model, and the collision risk may be corrected using the navigation state prediction result.

Note that the processing functions of the devices (for example, navigation monitoring devices 10, 102, and 102a) described in each of the above embodiments can be implemented by a computer. In that case, a program describing the processing content of the functions that each device is supposed to have been provided, and the above processing functions are implemented on the computer by the execution of the program on the computer. The program describing the processing content may be recorded on a computer-readable recording medium. The computer-readable recording medium includes a magnetic storage device, an optical disc, a semiconductor memory, and the like. The magnetic storage device includes a hard disk drive (HDD), a magnetic tape, and the like. The optical disc includes a compact disc (CD), a digital versatile disc (DVD), a Blu-ray disc (BD, registered trademark), and the like.

In a case where the program is to be distributed, for example, portable recording media such as DVDs and CDs in which the program is recorded are sold. Furthermore, it is also possible to store the program in a storage device of a server computer and transfer the program from the server computer to another computer via a network.

The computer that executes the program stores, for example, the program recorded on the portable recording medium or the program transferred from the server computer in its own storage device. Then, the computer reads the program from its own storage device and executes processing according to the program. Note that the computer may read the program directly from the portable recording medium and execute processing according to the program. Furthermore, the computer may sequentially execute processing according to the received program each time when the program is transferred from the server computer connected via the network.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a navigation monitoring program that causes at least one computer to execute a process, the process comprising:
    acquiring direction information that indicates a direction of a vessel and position information that indicates a position of the vessel; and
    predicting whether or not the vessel navigates along a course by inputting the acquired direction information and the acquired position information to a prediction model generated by machine learning by using direction information and position information for each of a plurality of vessels that has navigated in the past and a correct answer label that indicates whether or not each of the plurality of vessels navigates along the course,
    wherein the position information includes section information that indicates a section where a vessel is positioned among a plurality of sections set by dividing a course area with a certain width along the course into polygonal shapes with respect to a navigation direction,
    wherein the correct answer label is set to a value that indicates a correct answer in a case where a corresponding vessel among the plurality of vessels reaches a section that is a certain number of sections ahead from a section where the vessel is currently positioned of the plurality of sections with respect to the navigation direction.

2. A navigation monitoring method for a computer to execute a process comprising:
    acquiring direction information that indicates a direction of a vessel and position information that indicates a position of the vessel; and
    predicting whether or not the vessel navigates along a course by inputting the acquired direction information and the acquired position information to a prediction model generated by machine learning by using direction information and position information for each of a plurality of vessels that has navigated in the past and a correct answer label that indicates whether or not each of the plurality of vessels navigates along the course,
    wherein the position information includes section information that indicates a section where a vessel is positioned among a plurality of sections set by dividing a course area with a certain width along the course into polygonal shapes with respect to a navigation direction,
    wherein the correct answer label is set to a value that indicates a correct answer in a case where a corresponding vessel among the plurality of vessels reaches a section that is a certain number of sections ahead from a section where the vessel is currently positioned of the plurality of sections with respect to the navigation direction.

3. The non-transitory computer-readable storage medium according to claim 1, wherein the position information includes the section information and at least one of a latitude and a longitude.

4. A navigation monitoring device comprising:
    one or more memories; and
    one or more processors coupled to the one or more memories and the one or more processors configured to:
    acquire direction information that indicates a direction of a vessel and position information that indicates a position of the vessel, and
    predict whether or not the vessel navigates along a course by inputting the acquired direction information and the acquired position information to a prediction model generated by machine learning by using direction information and position information for each of a plurality of vessels that has navigated in the past and a correct answer label that indicates whether or not each of the plurality of vessels navigates along the course, wherein the position information includes section information that indicates a section where a vessel is positioned among a plurality of sections set by dividing a course area with a certain width along the course into polygonal shapes with respect to a navigation direction, wherein the correct answer label is set to a value that indicates a correct answer in a case where a corresponding vessel among the plurality of vessels reaches a section that is a certain number of sections ahead from a section where the vessel is currently positioned of the plurality of sections with respect to the navigation direction.

5. The non-transitory computer-readable storage medium according to claim 1, wherein the direction information includes course over ground.

6. The non-transitory computer-readable storage medium according to claim 1, wherein the prediction model is generated by using destination information that indicates a destination of a vessel, wherein the predicting includes inputting the destination information regarding the vessel to the prediction model.

7. The non-transitory computer-readable storage medium according to claim 1, wherein the prediction model is generated by using size information that indicates a size of a vessel, wherein the predicting includes inputting the size information regarding the vessel to the prediction model.

\* \* \* \* \*